United States Patent [19]
Gregg

[11] Patent Number: 5,603,371
[45] Date of Patent: Feb. 18, 1997

[54] ELECTRONIC POWER ANGLING ROD FOR A WINDOW BLIND

[76] Inventor: Richard D. Gregg, P.O. Box 185, Oroville, Calif. 95965

[21] Appl. No.: 461,633

[22] Filed: Jun. 5, 1995

[51] Int. Cl.⁶ ..................................................... E06B 9/26
[52] U.S. Cl. .................. 160/176.1; 160/DIG. 17
[58] Field of Search ................. 160/176.1 P, 168.1 P, 160/1, 5, 7, 188, 189, DIG. 17

[56] References Cited

U.S. PATENT DOCUMENTS

| | | |
|---|---|---|
| 2,876,834 | 3/1959 | Walker . |
| 3,559,024 | 1/1971 | Marder . |
| 3,809,143 | 5/1974 | Ipekgil . |
| 4,096,903 | 6/1978 | Ringle, III . |
| 4,492,908 | 1/1985 | Stöckle et al. . |
| 4,550,759 | 11/1985 | Archer . |
| 4,644,990 | 2/1987 | Webb et al. ............. 160/176.1 P |
| 4,664,169 | 5/1987 | Osaka et al. . |
| 4,706,726 | 11/1987 | Nortoft . |
| 4,979,550 | 12/1990 | Long et al. . |
| 5,391,967 | 2/1995 | Domel et al. ............. 160/176.1 P |
| 5,444,339 | 8/1995 | Domel et al. ............. 160/176.1 P |
| 5,465,779 | 11/1995 | Rozon ....................... 160/176.1 V |

Primary Examiner—David M. Purol

[57] ABSTRACT

A powered angling rod readily connected in combination with a new or existing window Venetian blind unit, replacing the original manual-only angling rod, wherein, the window blind includes a head rail and parallel slats pivotally mounted. The powered angling rod comprises an elongated small size tubular main housing preferably closely visually resembling current manual-only control rods. Preferably a vertically adjustable hook structure is provided for readily connecting the powered angling rod to rotatable drive shafts protruding from the head rail, which vary widely in length between manufacturers of Venetian/mini-blinds. The adjustable hook structure also serves as a rotating power shaft for tilt angling the blind slats and is coupled to a motor shaft arrangement for rotational power. The motor is partially confined within the upper terminal end of the main housing. An anti-rotation structure readily connects between the main housing and a stationary item such as the head rail to render the motor and main housing stationary while leaving the motor shaft arrangement free to rotate the hook structure to alter the position of the blind slats. Within the main housing is micro-powered, power saving electronic control circuitry for automatic actuation of the motor via light or temperature detection sensors, and manual control via push switch, or infrared remote control. A battery power source is also within the main housing. The powered angling rod readily attaches to virtually any Venetian/mini-blind suitable to use a manual-only rod.

8 Claims, 17 Drawing Sheets

PRIOR ART Fig. 1A
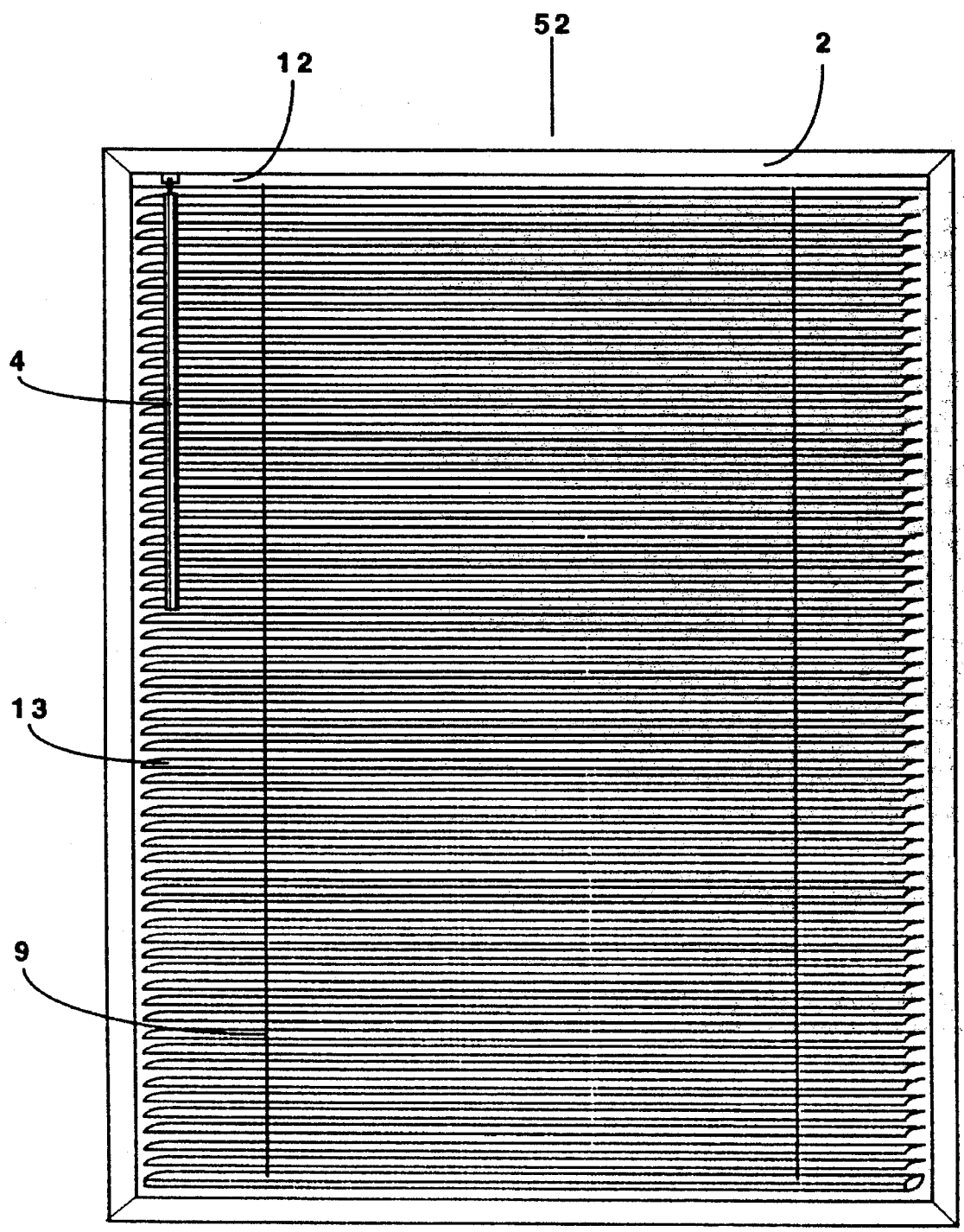

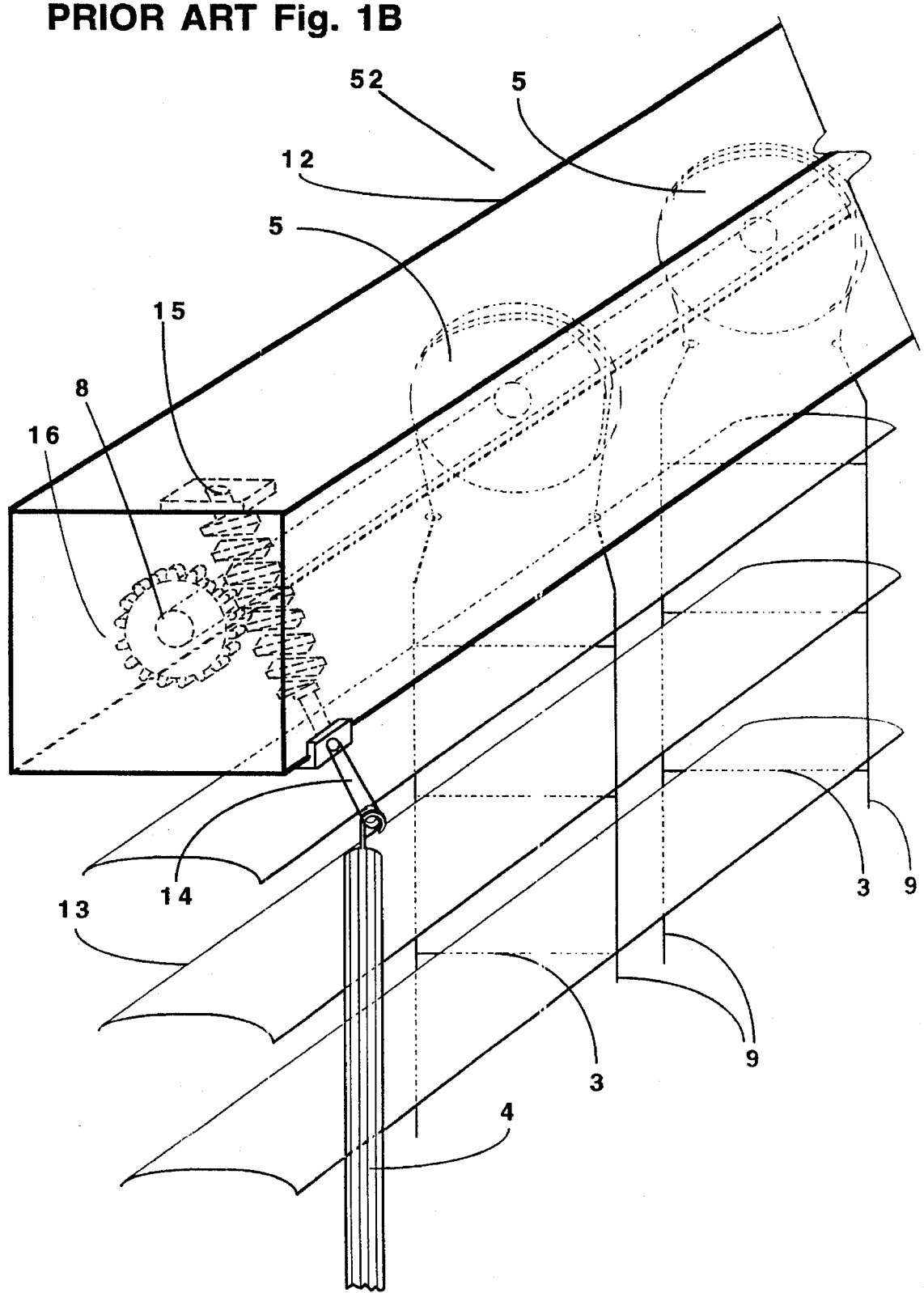

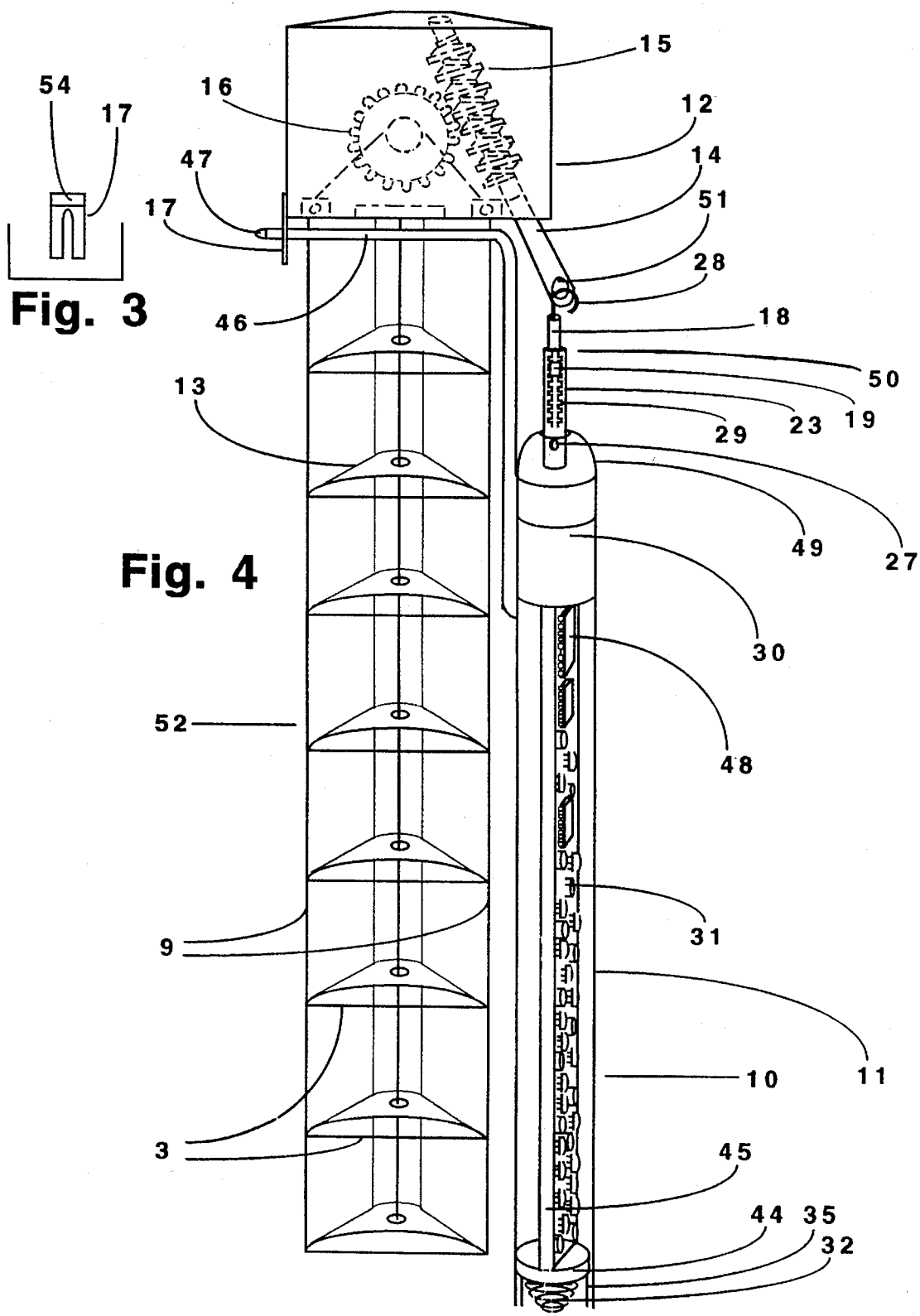

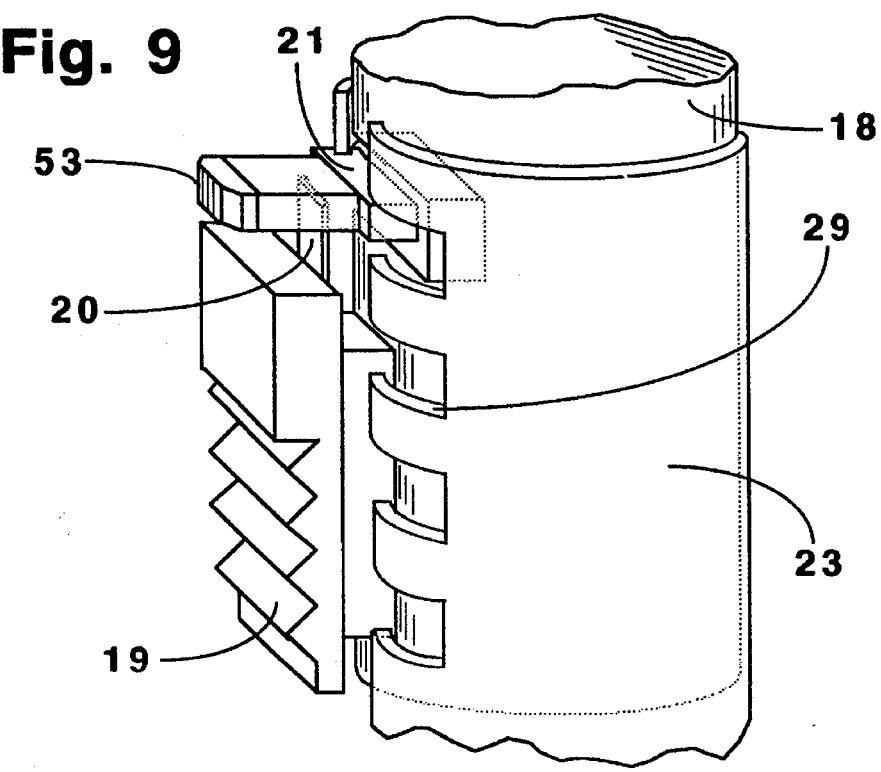
Fig. 9
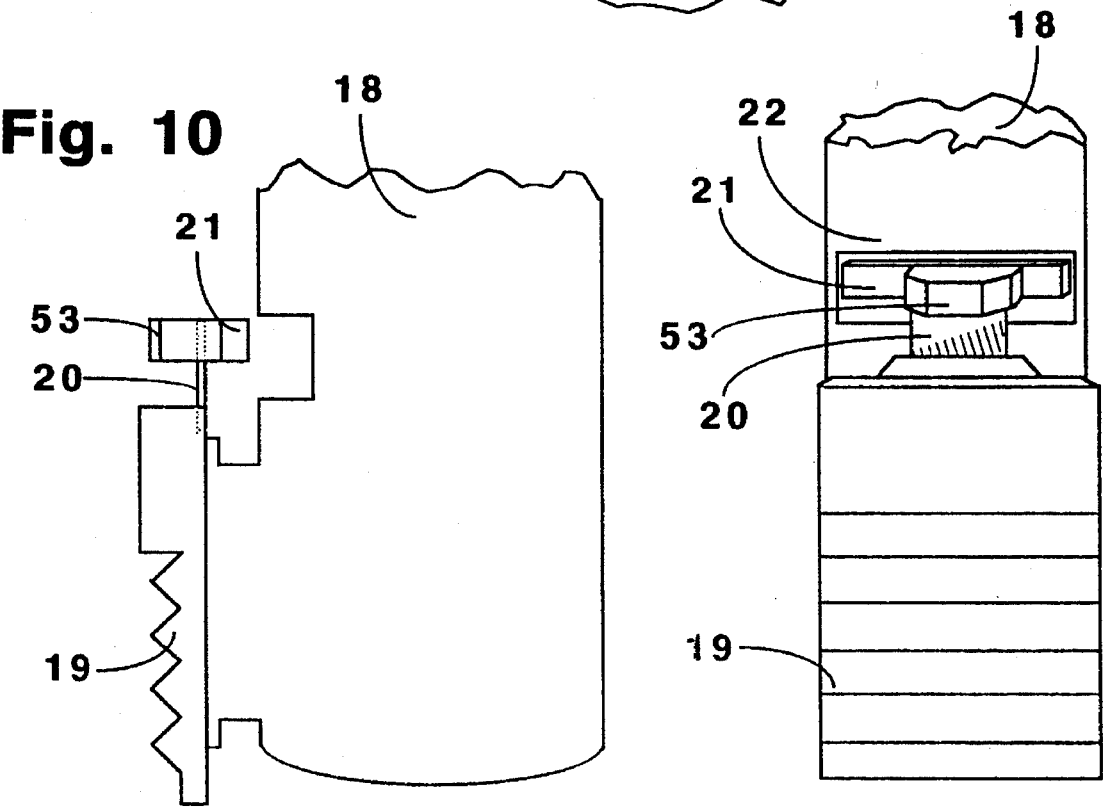
Fig. 10
Fig. 11

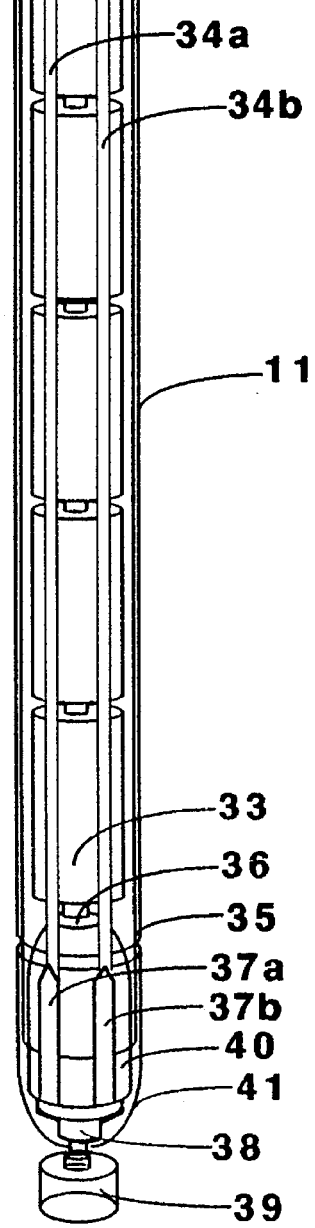
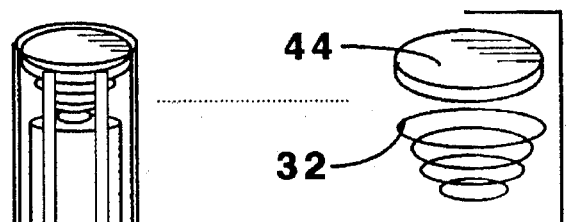
Fig. 14
Fig. 13

Micro-powered Memory Flip-Flop Circuit

Motor direction / brake / drive circuit

Micro-powered Infrared receiver / remote control circuit

Output to flip-flop memory circuit, figure 19

ELECTRONIC POWER ANGLING ROD FOR A WINDOW BLIND

BACKGROUND OF THE INVENTION

1. Field of the Invention

This invention relates to electric devices that trigger, control, and power angle change in the slats of a window blind unit, such as a Venetian blind (mini-blind) or the like in response to changing light and/or temperature and/or manual or manual remote control signals.

2. Description of Related Prior Art

Venetian blinds, often called mini-blinds when the slats are thin, are window blind units that include a plurality of horizontally arranged parallel slats, arranged and suspended in space in a vertical stack by cords (strings) that are pivotally mounted normally over pulleys on a horizontal main shaft located above and parallel to the slats, and within a horizontal parallel housing called the head rail attached to the window frame top or header inside the building. With modern Venetian blinds, the horizontal shaft within the head rail most commonly has a worm wheel connected at one end. Arranged perpendicular and meshed to the horizontal worm wheel is a worm gear with a short shaft attached and angled approximately ninety degrees downward protruding through an opening in the head rail facing opposite the window of installation. The short protruding shaft extending from the worm gear varies in length, and its length is dependent upon the design choice of the manufacturer. Rotation of the shaft rotates the worm gear which rotates the worm wheel which in turn rotates main horizontal shaft and pulleys to move or pivot the cords supporting the slats. The cords supporting the slats are loops, one loop per pulley. At the end of the short protruding shaft, opposite the worm gear, is an eyelet (hole). The eyelet allows the connection of a plastic or wooden rod (wand) with a hook arrangement at one end that connects to the eyelet. The attached rod hangs vertically downward from the head rail. The rod allows the user to manually set the angle of the parallel slats of a typical Venetian blind window unit by grasping the rod in hand and rotating or spinning it either clockwise or counterclockwise dependant upon the direction of desired movement of the slats. Examples of Venetian blinds with horizontal slats are shown in U.S. Pat. Nos. 2,876,834; 3,809,143; and 3,559,024. As a convenience to the user, automatic control of the blind slat angle is desirable as a way to save energy through passive heating, by angling blinds closed during the night and opening during the day in winter months, and by closing temporarily during intense solar radiance appearing on the windows in summer months to save on air conditioning, and also give a lived in appearance to prevent burglaries and the obvious privacy blinds provide to the occupant of a structure.

As a result, various structures and methods of automatically controlling the angle of Venetian blinds exists. They comprise premanufactured Venetian blind units with a motor, gearbox, and position switches usually installed within the head rail. The motor and gearbox are coupled to the horizontal parallel shaft and by electronics and/or manual switches, perform the function of angling a Venetian blind window unit open or closed. The electronics comprise light and/or heat sensors and/or timers, and their associated circuits, located in the head rail or in a utility control box embedded in a wall adjacent the window Venetian blind unit, and are connected electrically to the AC line, motor, and position switches. These automatic, electrically powered, blind angling devices require labor intensive installation which makes them expensive and un-affordable to most potential users. All prior art in this area is generally directed toward what appears to be expensive installations for high rise buildings, and high priced residences. The related prior art devices are generally not structured to be inexpensive and therefore not a practical option to most potential consumers. Of the prior art devices for controlling the angle of a Venetian blind relevant to my invention, the following typify the structures, methods of use, and the problems associated therewith: A U.S. Pat. No. 4,550,759, issued to Archer Nov. 5, 1985, discloses a blind angle controlling apparatus structured to have a hand operated mechanism and simultaneously operated automatic drive. The operated automatic drive is located within the head rail at the top of the window, and the whole of the Venetian blind unit is located within the confines of two to three panes of glass. The hand operated mechanism is a rod extending from and connected via a flexible shaft and slip clutch, to the horizontal parallel shaft within the confines of the head rail, the rod itself freely hanging vertically to one end of the head rail. The structure of the Archer apparatus provides for a labor intensive installation and is designed for a multi-unit structure, such as an office building, and therefore is potentially expensive, and this precludes its use by the potential average home or apartment dweller. Potentially, the whole window would have to be replaced to accommodate the Archer apparatus, and could not be considered an economical after-market retrofit device. The Archer apparatus could not be considered transferable, by which it could be removed and transferred from one window to another window in the same structure or to a window in a completely different structure in a different location. An earlier apparatus, invented by Ringle, III, U.S. Pat. No. 4,096,903 on Jun. 27, 1978 is similar to and has similar drawbacks as the Archer apparatus.

Nortoft was granted U.S. Pat. No. 4,706,726 on Nov. 17, 1987 for the electric control of Venetian blinds. The Nortoft apparatus gives the user the ability to control angular position, by electric motorized mechanics, independently of raising or lowering the Venetian blind. The motorized mechanics of the Nortoft apparatus is built within the confines of the head rail. The control circuitry is external to the blind housing, and appears to be attached to, or embedded in the wall, electrically connected by wire cable, and its power source is supplied by household AC current. Although the motor, spring clutches, and other mechanisms are hidden within the blind housing, the cables and control circuitry must be hidden for practical design purposes, and require labor intensive effort to effect their integration into the design motif, such as running cables into the wall, and cutting a slot into the wall sheathing to accommodate the control box. This precludes the Nortoft Venetian blind unit from ever feasibly being removed from a window once installed because of the expensive labor intensive effort needed to effect removal and transfer to another window. Dimensions of windows vary widely from one structure to another and many Venetian blinds must be custom manufactured to fit the multitude of window dimensions, which precludes the Nortoft Venetian blind apparatus from any practical transfer to another window in another structure, once installed.

Osaka and Sagawa were granted U.S. Pat. No. 4,664,169 on May 12, 1987 for a Venetian blind apparatus comprising a plurality of spaced parallel slats, called louvers by the inventors, and secured for rotation about parallel axes and is centered within two light transparent walls of the housing. The louvers are tilt angled open or closed by the mechanical action of a ceramic piezoelectric bimorph, when powered by a direct current source, such as a solar charged battery or other direct current source. In addition a motor and gearbox are installed in the head rail to accommodate vertical raising or lowering of the Venetian blind. Although it is claimed that the bimorph mechanism is an economical method for tilt angling the louvers/slats, one problem with the bimorph mechanism is that it will only tilt angle the slats/louvers in one direction of orientation. Another problem which increases cost is that the bimorph mechanism must be manufactured longer or shorter, and be powered with more or less current to accommodate the mechanical power output needed to tilt angle a larger or smaller Venetian blind. The dimensions of the Osaka and Sagawa Venetian blind apparatus once manufactured, are static to a particular sized window and can not feasibly be resized or transferred unless the new window dimensions are equivalent and then the whole Venetian blind apparatus, including housing, head rail, slats, cords, etc. must be transferred. In addition, the Osaka and Sagawa Venetian blind apparatus requires special materials, more expensive than conventional materials used in comparable blind apparatus. There is no mention of location of a switch or electronics for triggering the bimorph mechanism, only that it can be controlled by a switch. It must be assumed that the control switch would be placed in a convenient location for the user, most likely in the wall or window sill precluding the Osaka and Sagawa Venetian blind apparatus from a convenient, and inexpensive transferal to another window.

Long and Shelton were granted U.S. Pat. No. 4,979,550 on Dec. 25, 1990 for a window blind control apparatus that allows for selective control in the angling function of opening or closing a Venetian blind window unit or the like. Selective control includes a photo-electric cell, a radio frequency controller, a manually displaceable slide switch, or a manually rotatable control rod, to perform the previously mentioned functions. Although the Long and Shelton device appears to be structured so the device could be transferable to various Venetian blind units of different sizes, no claim is made for this convenience of use. The problem with their apparatus is that the physical structure is box shaped and must be attached with machine screws to the adjacent wall next to the input shaft on the head rail. And further the photo-cell for light detection is attached to the adjacent window sill via an obtrusive wire cord running to the box shaped apparatus containing the motor and associated circuitry. The apparatus as depicted by Long and Shelton would be objected to by many consumers because it is obtrusive and does not fit well into the Venetian blind motif as the original angling rod. The window blind unit would need an accompanying Valence to help hide the obtrusive apparatus, and still could be seen by individuals close to the window. Long and Shelton make reference to U.S. Pat. No. 4,492,908 for circuitry in conjunction with photo-electrics of controlling the blind angle. This circuitry could be powered by batteries, but only for a very short time before replacement or recharge would be needed. Therefore, an outside power source, such as AC power, or solar, would be needed in combination with the Long and Shelton apparatus to be convenient to the user and would require expensive, labor intensive, unsightly if not hidden, power cabling, or solar array installation.

SUMMARY OF THE INVENTION

The present invention may take numerous structural forms all falling within the scope of the invention as depicted in the appended claims, however several detailed structural embodiments will be described and shown in the drawings in order to illustrate the invention by way of example, with these examples not to be considered to be the only structures which meet the objects and provide the benefits of the present invention. My invention of this disclosure is a powered angling rod structured with the intent to solve many of the problems associated with the related prior art devices. One of the major objects and advantages of my invention includes unique structuring which, utilizing modern plastic injection and extrusion molding techniques, automated printed circuit production utilizing surface mount technology, and readily available miniature motor gear heads, allows the production of a simple, adaptable, easy to install, easy setup, highly effective, reliable, and inexpensive after-market retrofit apparatus for use in combination with just about any and all existing Venetian blind units, or for use on newly manufactured Venetian blind units.

My powered angling rod readily connects in combination with a new or existing window Venetian blind unit, replacing the original manual-only angling rod, wherein, the window blind includes a head rail and parallel slats pivotally mounted. The powered angling rod comprises an elongated small size tubular main housing preferably closely visually resembling current manual-only control rods which are cylindrical tubes or rods of sufficient downward extending length to grasp when standing on the floor. The present tubular main housing is also preferably cylindrical tubing, but may be square, rectangular or other shaped tubing. Preferably the present invention includes a vertically adjustable hook structure provided for readily connecting the powered angling rod to rotatable drive shafts protruding from the Venetian head rail, which vary widely in length between manufacturers of Venetian blinds. The adjustable hook, being extendable and retractable relative to the lengthwise axis of the tubular main housing allows for easy adjusting of the hook position relative to a main housing torque brace used with the present invention. The torque brace connects to the bottom or underside of the head rail, and between the many different manufacturers of Venetians blinds, there is varying distances between the rotatable eyelet extending from the head rail for connecting the rod for adjusting slat angle, and the bottom of the head rail. Therefore the extendable and retractable hook structure of the present invention allows for the quick and easy attachment of the present invention, and the rendering of the main housing non-rotatable against the bottom of the head rail of most typical Venetian blinds regardless of the manufacturer. The adjustable length hook structure could be made none adjustable and the torque brace could be made adjustable to achieve the same end result.

The adjustable hook structure serves as a rotating power shaft for tilt angling the blind slats and is coupled to a motor shaft arrangement for rotational power. The motor is partially confined within the upper terminal end of the main housing. An anti-rotation structure readily connects between the main housing and a stationary item such as the head rail to render the motor and main housing stationary while leaving the motor shaft arrangement free to rotate the hook structure to alter the position of the blind slats. Within the main housing is micro-powered, power saving electronic control circuitry for automatic actuation of the motor via light or temperature detection sensors, and manual control via push switch, or infrared remote control. A battery power source is also within the main housing. The powered angling rod readily attaches to virtually any Venetian blind suitable to use a manual-only rod.

In a first embodiment, the present powered angling rod includes an autonomous micro-powered electronic circuit, including manual switch, adjustable ambient light sensitivity control, temperature detection, memory, position-counter, motor brake, motor gear head, counting sensor, trigger magnet, photo sensor, and infrared light modulated receiver, which are all contained within the confines of a cylindrical plastic tube shaped housing. Utilizing modern plastic extrusion molding techniques, the housing for the powered angling rod can be produced efficiently and inexpensively. The powered angling rod closely resembles and is approximately the diameter and length of the typical plastic or wooden angling rod installed on the typical Venetian blind, for the purpose of an automatic, manual, or remote control of the blind angle. Therefore the powered angling rod is structured to be readily attachable to new or existing manually controlled Venetian blind window units by simply removing the original plastic or wooden rod and in its place, attach the electronic powered angling rod. By using miniature components and encompassing them into the confines of a plastic tube, the task of manual or automatic angling of a Venetian blind is accomplished inexpensively, by eliminating the added expense of the Venetian blind itself in the manufacturing process. Eliminating the Venetian blind unit would greatly reduce the manufacturing cost by eliminating materials, labor intensive assembly, and installation time required of all previous prior art. My invention has the advantage of being structured so as to be connectable to the multitude of dimensionally variable, new and existing, Venetian blinds, in addition has the advantage of being structured for easy transferability and does not subtract from the original Venetian blind design motif with obtrusive cords, box shaped housings, and the like.

In a second embodiment of the invention, the hook device arrangement structured as part of the terminal end of a rotating power shaft on the powered angling rod, which attaches to the eyelet at the end of the short connecting shaft protruding from the head rail is structured to be vertically adjustable, by a linear ratchet device incorporated within and acting as a rotating power shaft. The structure incorporating the linear ratchet device allows the powered angling rod to be readily adaptable to the many varying lengths of connecting shafts that protrude from the head rail on existing and new Venetian blinds sold on the market. The overall structure of the linear ratchet device and incorporated with an open hook at the terminal end or other such removable connecting apparatus allows for simple and quick installation.

The light sensor detection circuitry is electronically configured to use the least amount of power in standby conditions, which affords a micro-ampere power drain on the batteries in the range of three to six micro-amperes, except for the one to two seconds, two to four times per day, it takes the motor gear head to perform the automatic blind angling function. Intermittent manual control would obviously add to the total power consumption over time but is negligible since the average life span of the batteries is two years or more with the standby current drain previously mentioned. This affords an advantage over the prior art, since there is no need for external power sources and its associated wire cabling. The long shelf life of alkaline or lithium batteries in addition to the minuscule drain of the light detection circuitry plus the long interval between and ease of battery replacement makes the use of an external power source obsolete. Although some prior art indicates the possible use of solar charged batteries, this adds to the initial cost of manufacturing and sufficient power may not be generated from photovoltaic cells which would be only exposed to direct sunlight for a brief time, and only windows facing generally to the southeast or southwest, and would depend mostly on reflected ambient light for power generation, especially windows at the northern exposure. The prior art does not indicate any use of micro-powered electronic circuitry to free itself from external power sources, only that angling a Venetian blind can be accomplished with little power, referring to the brief time involved to accomplish the angling task. The present invention solves the power problem as previously mentioned and if the need for a zero maintenance power source does arise, the batteries could easily be kept charged by less expensive low power thin film flexible photovoltaic cells designed for ambient light conditions, by incorporating them into the powered angling rod facing the window. And further the rechargeable batteries could easily be replaced with memory capacitors, although more expensive, they last a very long time, effectively eliminating all maintenance.

The micro-powered circuitry includes a simple memory which keeps the blind angle synchronized to the light conditions, no matter what angle set manually. Further, the blind angle will temporarily move to the closed angle position when a predetermined temperature point is reached during increased solar radiance on the window of installation and open again when temperature decreases. The user has the options of turning temperature detection off allowing the sun to passively heat a room in winter, manual control off to eliminate unauthorized use, or automatic function off to leave Venetian blinds in a static state with no automatic function, but with the manual control function still operable. Options also include the ability to set the blind angle orientation from either top closed to horizontal open or bottom closed to horizontal open. And further, response to ambient light conditions for automatic control is electronically adjustable and includes a delay timer to prevent fluctuating light levels from creating false signals, inherent during dawn or dusk conditions. And further, the blind can be set to four different angling stops, which are approximately twenty degree, thirty degree, forty five degree, fully open horizontal angle.

BRIEF DESCRIPTION OF THE DRAWINGS

Prior Art FIG. 1A shows a window covered with a typical prior art Venetian blind having a typical manually operable slat angle control rod.

Prior Art FIG. 1B illustrates a typical head rail with conventional slat angle drive mechanics for manual control via the control rod of prior art FIG. 1A.

FIG. 3 is a front view of a torque brace clip used with the present invention.

FIG. 4 is a side view close up of the upper section of the invention showing the attachment of the powered angling rod to the window blind unit. The torque brace clip of FIG. 3 is shown in use in a side view.

FIGS. 9, 10, and 11 are partial side views of the telescoping connecting shaft and connecting device as depicted in FIGS. 6, 7, and 8.

FIGS. 13, and 14 are isometric illustrations of the lower structural housing encompassing the battery cells and associated structures.

DESCRIPTION OF THE PREFERRED EMBODIMENTS

Figure 1:
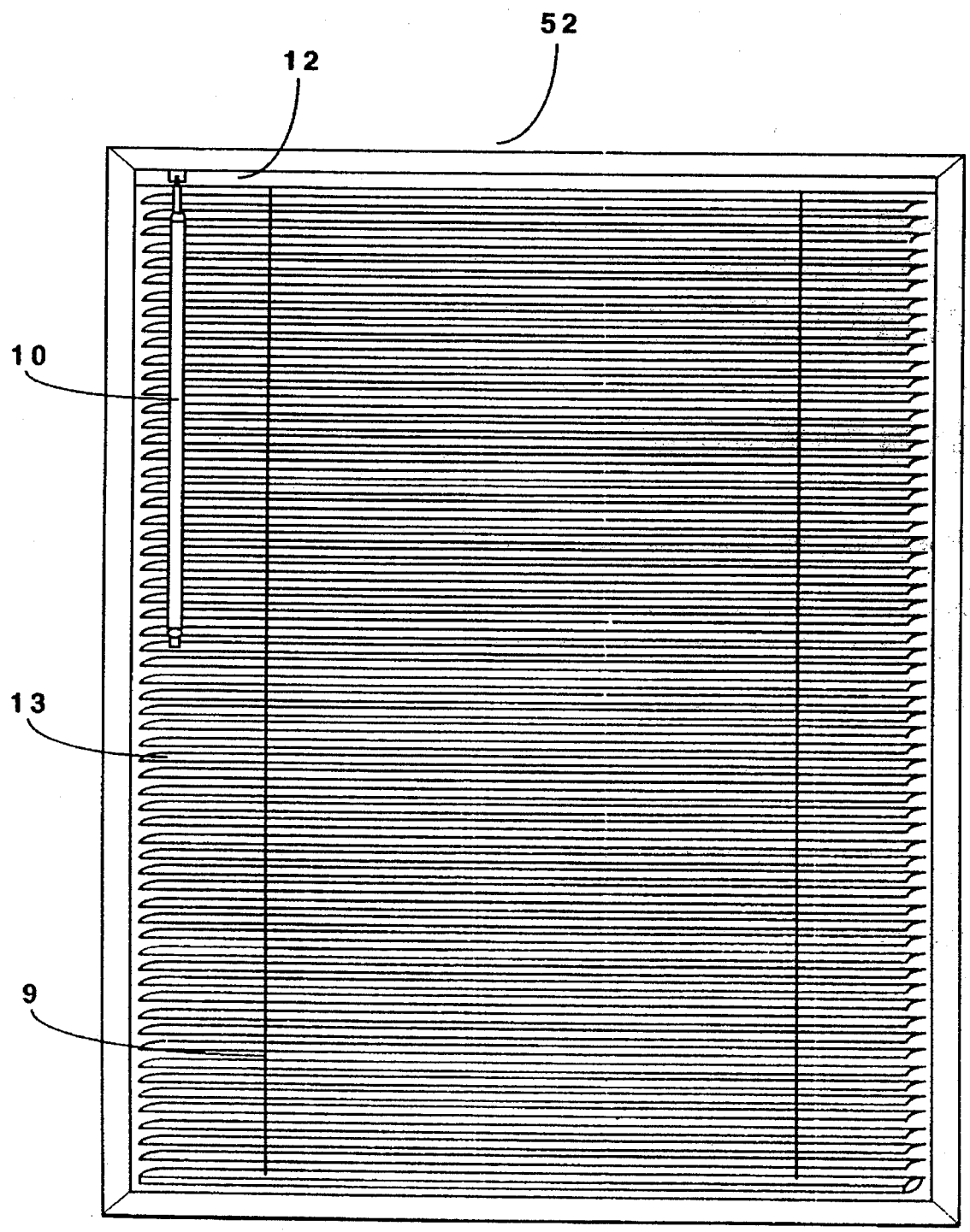
FIG. 1 is a front view of the present invention in combination with a typical Venetian window blind unit.

With reference now to drawing FIGS. 1 to 21 of the present invention, and to Prior art FIGS. 1A and 1B, a new and improved window blind control apparatus embodying the principles and concepts of the present invention and generally designated by the reference numeral 10 will be described. Prior Art FIG. 1A shows a window 2 covered with a typical prior art Venetian blind 52 having a typical manually operable slat angle control rod 4 extending downward from head rail 12 positioned at the upper end of slats 13. The control rod 4 is shown positioned laying in a vertical hanging plane over the front of the slats 13 and in close adjacency to the slats. Rod 4 is connected at the upper end thereof to a slat angle rotary drive mechanics.

Prior Art FIG. 1B illustrates the typical head rail 12 with modern conventional slat angle rotary drive mechanics for manual control via the control rod 4. Venetian blinds manufactured many years ago were often structured with pull cords to alter the angle of the slats. However, the most typical or standard modern control mechanics are about the same or are very similar to that shown in FIG. 1B and which generally comprise a horizontally positioned rod 8 rotatably connected in and to head rail 12; multiple pulleys 5 affixed to rod 8 to spin with rod 8, with the pulleys 5 in spaced relationship with one another. A worm gear wheel 16 is attached to rod 8 usually toward one end thereof. A worm gear 15 is rotatably attached to head rail 12 and in contact with gear wheel 16 so that rotation of worm gear 15 causes rotation in worm gear wheel 16 which in turn rotates rod 8 and pulleys 5. Trained over pulleys 5 are loops of string or cord 9, one loop per pulley 5 normally. The loops of string 9 hang downward and include short horizontally disposed strings 3 connecting across the two sides of a given loop. Slats 13 rest atop horizontal strings 3 between multiple loops of string 9. The loops 9 trained over pulleys 5 are such that the string moves with the pulleys 5 when rotation occurs, therefore strings 3 can be tilted, and thus the slats 13 resting atop strings 3 may be tilted to varying degrees of open, and to being vertically tilted to put the blind in a closed state. Normally slats 13 remain horizontal, but tilt with the edge nearest the window rolling in a radius nearer or further relative to the window. In typical Venetian blinds the rod 4 is the device which the user grasps in hand to rotate the rod 4 and ultimately pulleys 5 to adjust the angle of the slats 13. The upper end of rod 4 in modern Venetian blinds includes a connector of some type for connecting the rod 4 to the exposed end of a shaft of worm gear 15 which protrudes outward of head rail 12. The protruding shaft portion of the worm gear 15 exposed on the outside of the head rail 12 most commonly includes a hole therethrough, and rod 4 most commonly includes a hook which inserts through the hole at which point rod 4 dangles in front of the slats 13 and inside the building. Although with modern Venetian blinds which are manually operable in slat angle via a rod 4, the most common connection structure between the exposed shaft of the worm gear 15 and rod 4 is the hook and hole arrangement, other connecting arrangement are used. Although not herein discussed due to the function not being adversely effected by the present invention, Venetian blinds commonly include structuring for allowing the blind, and specifically the slats 13, strings 9 and 3 to be drawn upward to nest in a stack directly underneath head rail 13 so as to leave the window view completely unobstructed. The drawing up of the Venetian blind will not adversely effect the present invention. All of the connecting systems for connecting the rod 4 to the exposed shaft end of the worm gear 15 include play or flexibility allowing the rod 4 to be grasped and pulled outward at an angle away from the window, with the lower end of the rod 4 furthest from the window, when the user is rotating the rod to change the angle of the slats 13. It should be noted that the distance between the point at which rod 4 attaches to shaft 14 of worm gear 15 normally via a hook on rod 4 inserting into a hole in shaft 14, and the bottom of the head rail 12 varies from one manufacturer to another, and this distance is important when the present invention is structured and used as a retrofit unit capable of being attached to just about all makes and models of conventional Venetian blinds via removing the existing rod 4 and attaching the present rod apparatus 10. The bottom of the head rail 12 is herein essentially defined as the point at which the vertically oriented side walls, i.e., front and rear side walls of the head rail terminate, as with further reading it will be disclosed and appreciated that I extend a torque brace or conduit 46 extending directing underneath the bottom of the head rail 12, as there is normally a slight space between the bottom of the head rail 12 and the upper most slat 13. It will become appreciated that torque bracing as is herein disclosed, i.e., from the front of the slat area straight back to the head rail 12 eliminates the need for unsightly and possibly more costly laterally extending boxes, brackets, cords, braces and the like to reach a stationary item such as a wall. As will become appreciated, my torque brace preferably includes a light sensor for detecting outside ambient light outside of the building and window.

Figure 2:
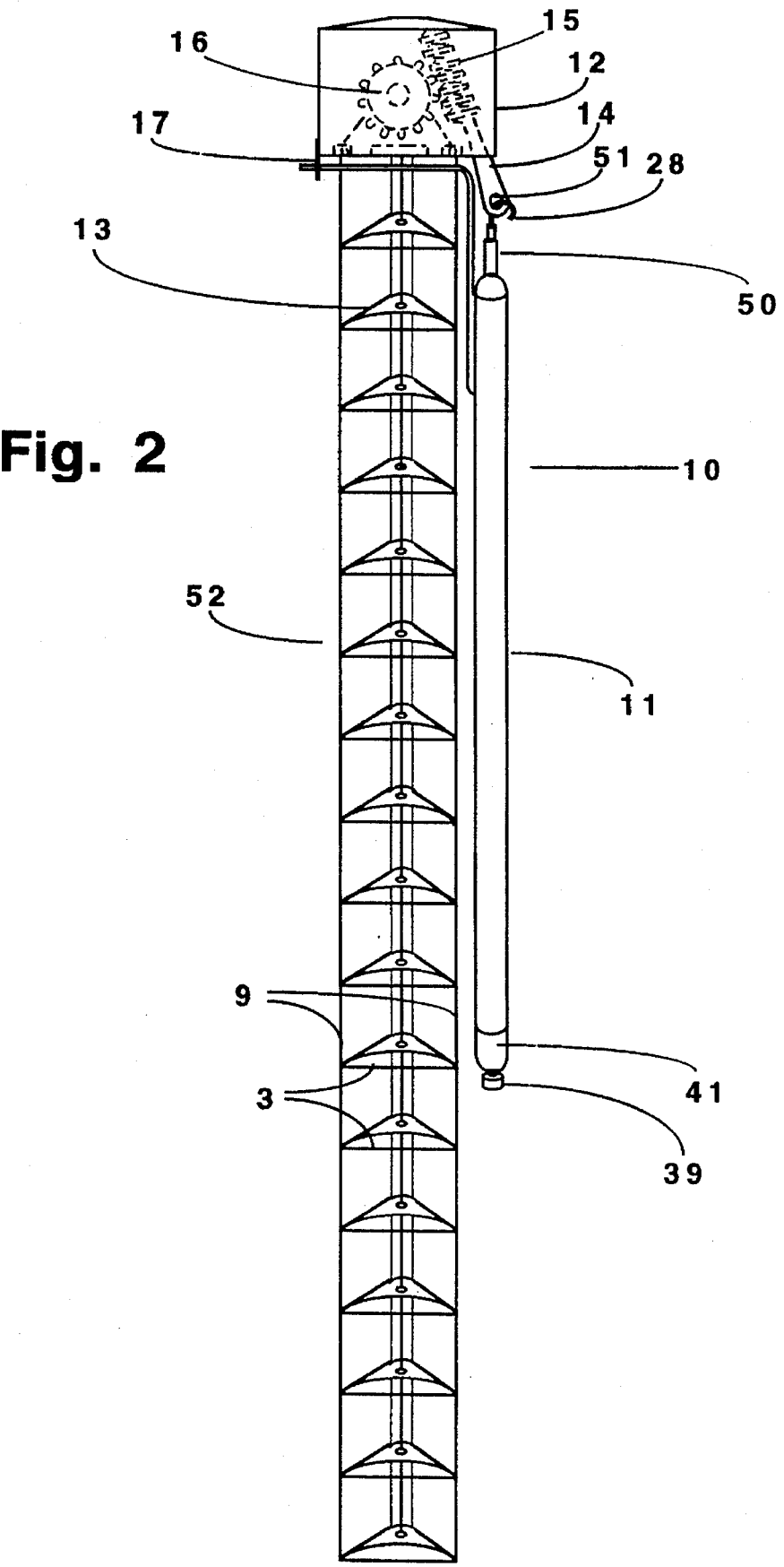
FIG. 2 is a side view of the invention in combination with a Venetian window blind unit.
Figure 5:
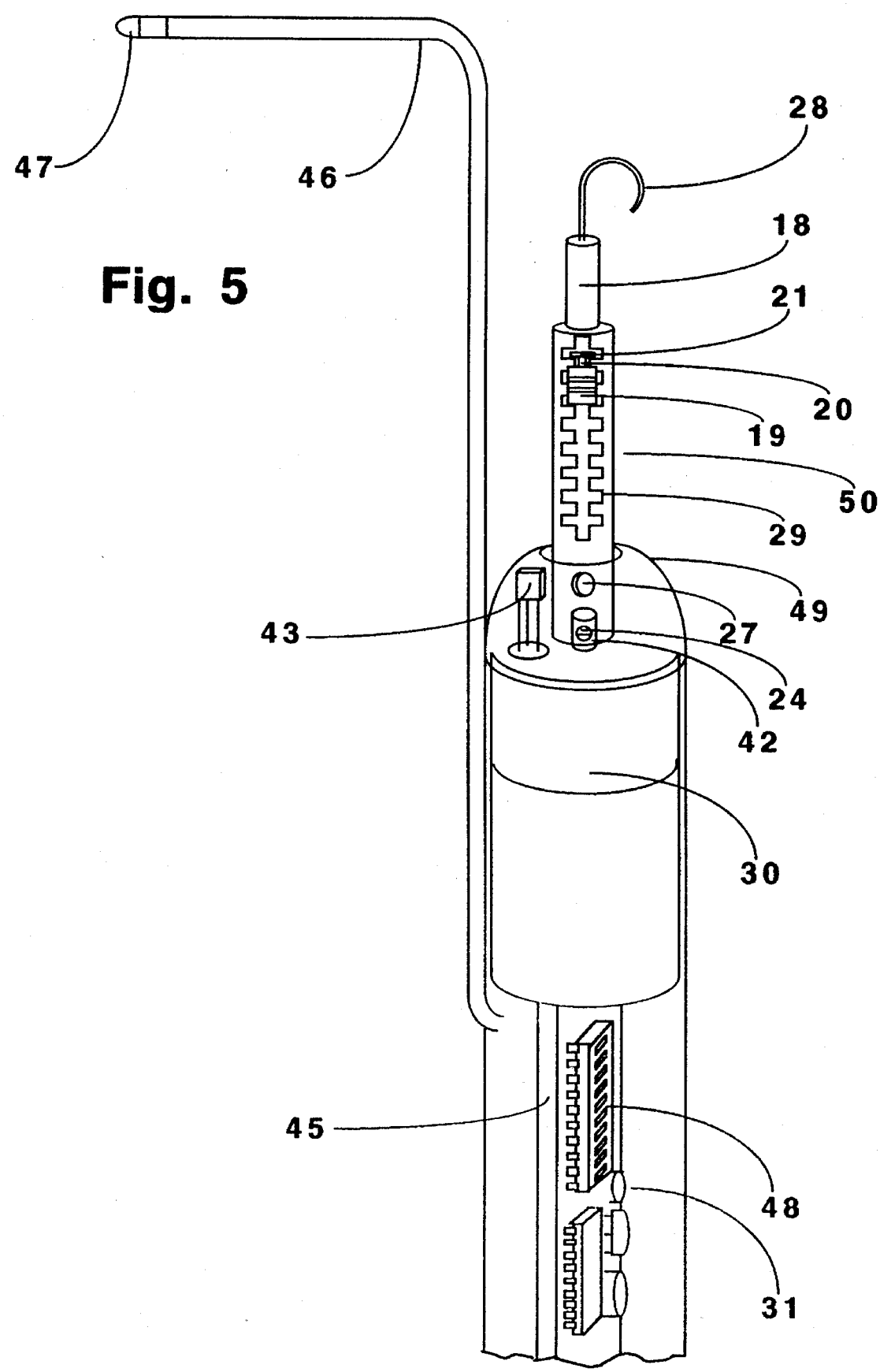
FIG. 5 is an isometric illustrated close up of the upper section of the invention as represented in FIGS. 3 and 4 showing a stabilizing structural conduit and position of a telescoping connecting shaft and hook.
Figure 6:
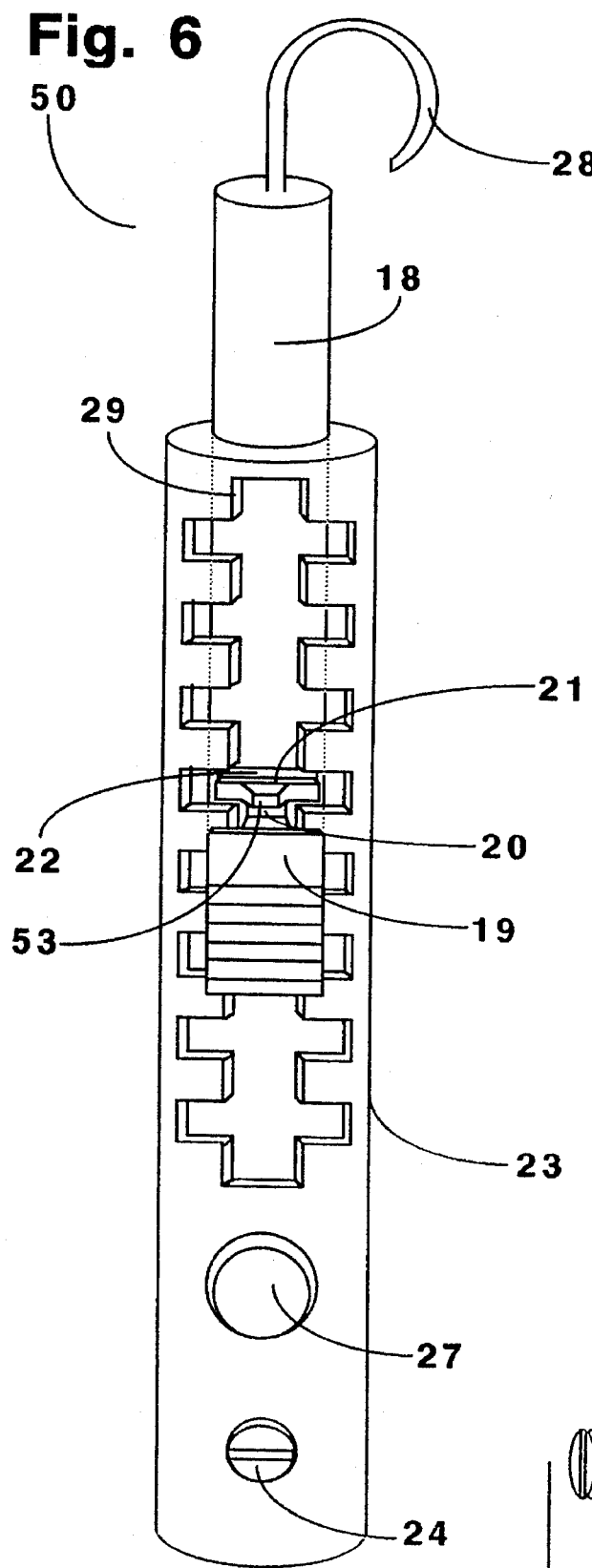
FIGS. 6, 7, and 8 are isometric illustrated views of the telescoping connecting shaft and connecting device.
Figure 7:
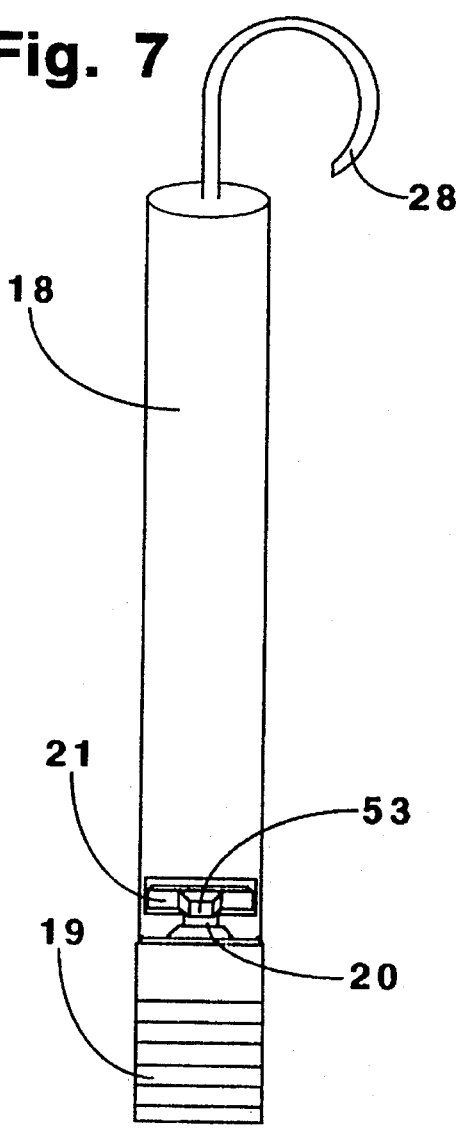
Figure 8:
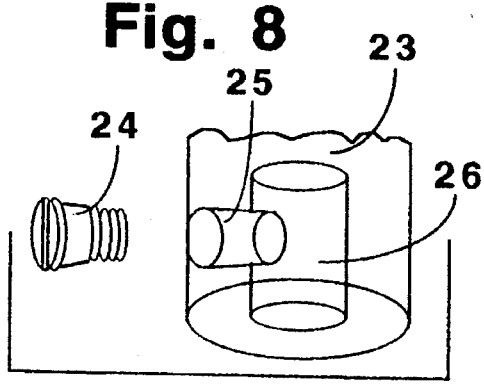

More specifically, it will be noted as illustrated in FIGS. 1, 2, and 4 that the present invention called Electronic Powered Angling Rod apparatus 10 is readily connected and oriented to operate in combination with an otherwise conventional prior art window Venetian blind 52 as previously described, less rod 4 of the prior art blind. In FIG. 1 is can be seen that apparatus 10 hangs in front of the slats 13, in close adjacency or actually slightly touching slats 13, inward of both sides of the window and hanging vertically downward in the same location as the typical prior art rod 4. It can also be seen that apparatus 10 appears substantially as the prior art rod 4. Venetian blind 52 typically includes a series of parallel slats 13 that are pivoted via a conventional drive mechanism comprising a worm gear 15 and worm wheel 16 meshed perpendicular in a downwardly angle and located within to one side of the head rail 12. Attached to and downwardly extending at the same angle from the worm gear 15 is the short protruding shaft 14, of varying length relative to the bottom of the head rail 12 depending on the manufacturer, usually with an eyelet 51, sometimes with an in part partly open eyelet or hook, or other connecting structure, at the terminal end opposite the worm gear 15, which allows connection of apparatus 10. The ratchet device 50 as illustrated in FIGS. 4, 5, and 6 allows apparatus 10 to connect to virtually any Venetian blind despite the varying lengths of short connecting shaft 14, and despite the distance between the point at which the apparatus 10 connects to shaft 14 and the bottom side or underneath surface of the blind head rail. Attaching the connecting hook 28 to eyelet 51 of shaft 14 of the slat angle rotary drive mechanics as illustrated in FIGS. 2 and 4 allows rotation of shaft 14 by a linear ratchet shaft 18 and as illustrated in FIGS. 4, 5, 6, and 7 situated and movable within the interior of a hollow slotted ratchet shaft 23. It should be noted that sometimes, depending on the manufacturer of the Venetian blind, the position of the hook on the rod equivalent to my hook 28, and the eyelet 51 on shaft 14 are reversed in relative position, wherein the eyelet is at the top of the rod and the hook is on the end of the shaft 14. Sometimes, two interlocking hooks or eyelets are utilized, and this too would work with the present invention. Tight fitting rubber or flexible tubing of sufficient stiffness and proper flexibility, with one end over shaft 18 absent hook 28, and with the other end of the tubing over the end of shaft 14 would also work with the present invention. All of these rod-to-slat angle rotary drive mechanics couplers include a universal joint effect, in that the lengthwise axes of the shaft 14 and of the rod, as in the rod 4 of the prior art or the apparatus 10 in accordance with the present invention, are not in straight alignment, as may be ascertained from FIG. 1B and FIG. 2. Therefore I foresee the need for the universal effect type couple in most if not all coupling arrangements which could be used with the present invention. I anticipate possibly making hook 28 threadably attached to shaft 18 so that it is readily removable when desired and replaced with another suitable attachment structure cooperative with whatever structure is present at the end of shaft 14, and with this in mind I might provide numerous types or styles of attachment ends with apparatus 10 when sold in the market place so that further insurance is provided to the consumer that my apparatus will be readily attachable to his or her Venetian blind at home.

Hollow slotted ratchet shaft 23 is coupled mechanically to gear motor 30 via coupler cavity 26 at lower terminal end of hollow slotted ratchet shaft 23 and secured by locking coupler screw 24 inserted into threaded cavity 25 to gear motor 30 output shaft 42. This allows the rotational energy output of gear motor 30 to be mechanically transmitted to Venetian blind unit 52 to pivot angle the slats 13. Illustrated in FIGS. 5, 6, 9, and 12, the interlocking slots 29 structured as part of the hollow slotted ratchet shaft 23 act to secure and lock linear movement in two directions, vertically of ratchet shaft 18 once the desired position of ratchet shaft 18 is calculated during installation of the electronic powered angling rod 10 to Venetian blind 52. Ratchet shaft 18 is unlocked and linearly adjusted by ratchet slider 19 via applied pressure from finger or thumb perpendicular to ratchet shaft 18 upon a pawl 21 through pressure tab 53, and connected at the terminal end of a flexible tongue 20 connected opposite the ratchet slider 19. Pawl 21 is pressed into a notch cavity 22 via pressure tab 53, allowing linear movement of ratchet shaft 18 within the hollow ratchet shaft 23 by way of concomitant perpendicular and linear pressure applied by finger or thumb to pressure tab 53 to pawl 21 and ratchet slider 19. When no pressure is exerted, the pawl 21 is situated parallel between the ratchet locking slots 29 securing the ratchet shaft 18 from linear movement but allowing rotational movement of ratchet shaft 18 concomitant with hollow ratchet shaft 23 by way of their mechanical coupling to gear motor 30.

Figure 15:
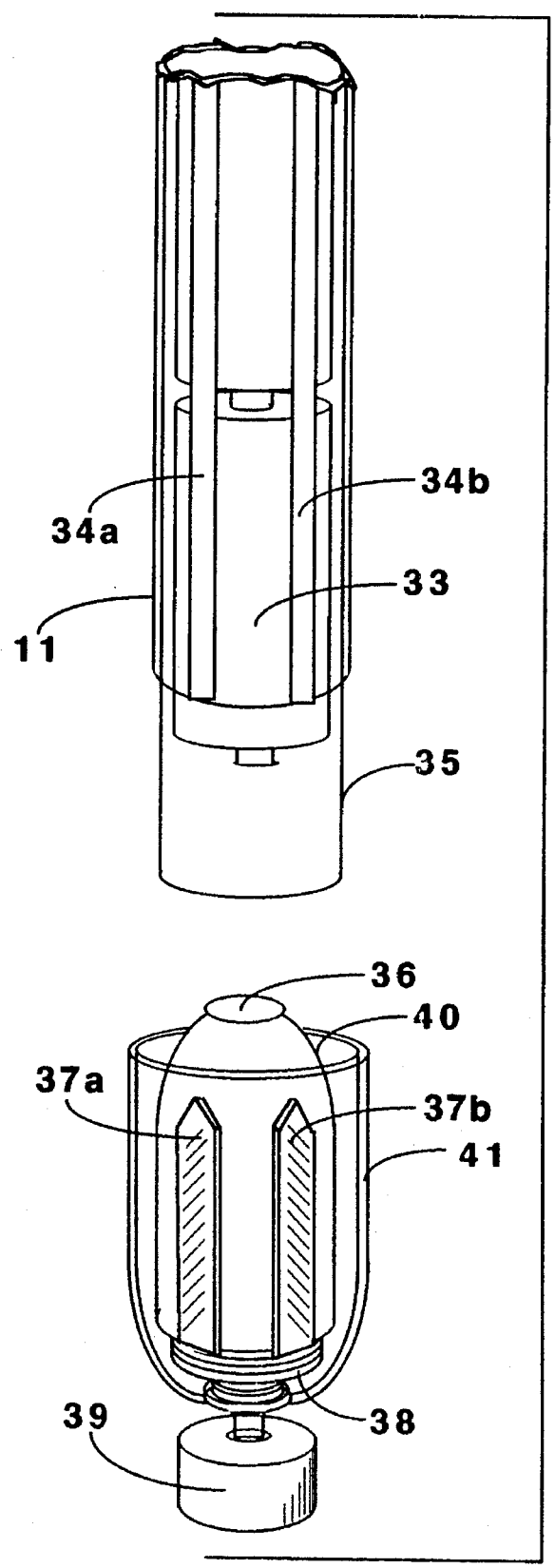
FIG. 15 is an exploded illustration showing a close-up view as depicted in FIG. 13, of the battery containment plug disconnected from the battery cell containment housing.

Located within the lower half of the main housing 11 of the Electronic Powered Angling Rod 10, below gear motor 30 and micro-powered electronics 31 and illustrated in a close up view in FIG. 15 is the battery housing 35. As illustrated in FIGS. 13 and 15, battery housing 35 contains the battery cells which supply power to micro-powered electronics 31. The battery cells 33 electrically connected in series, are held in place within the confines of the inner battery housing 35 with the upper terminal cell 33 cathode in electrical contact with a contact spring 32, supplying the negative ground to micro-electronics 31. The bottom terminal cell 33 anode is in electrical contact with a contact stud 36 which is the upper terminal end of the battery plug 40. Battery plug 40 serves three functions as illustrated in FIGS. 2, 13, 15, and 16, one is to hold frictionally the set of battery cells 33 in place against the cathode contact spring 32 and anode battery stud 36. Second, to pass electrical power from the battery cell 33 anode to battery stud 36, to strip contact 37a, to copper tape trace 34a which runs parallel and is attached to the outer surface of the inner battery housing 35, to power switch S-1 of DIP switch 48, FIGS. 4 and 5 and to positive power input of micro-powered electronics 31. Finally third, to house a momentary, normally off, push button switch 38 acts to manually trigger a pivot of the slats 13. Switch 38 is electrically in contact with strip contact 37b which in turn is in contact with copper tape trace 34b which runs parallel and is attached to the outer surface of the inner battery housing 35, which terminates and is electrically connected to the appropriate circuit of micro-powered electronics 31. The lower terminal housing shroud 41 which slips frictionally over switch 38, battery plug 40, and the protruding terminal end of battery housing 35 serves the dual purpose of pressing strip contacts 37a and 37b in electrical contact with copper tape traces 34a and 34b and simultaneously, hiding and integrating the above mentioned as part of the main housing 11. Push button cap 39 installs on terminal end of switch 38 as illustrated in FIGS. 2, 13, 15, and 16.

Figure 12:
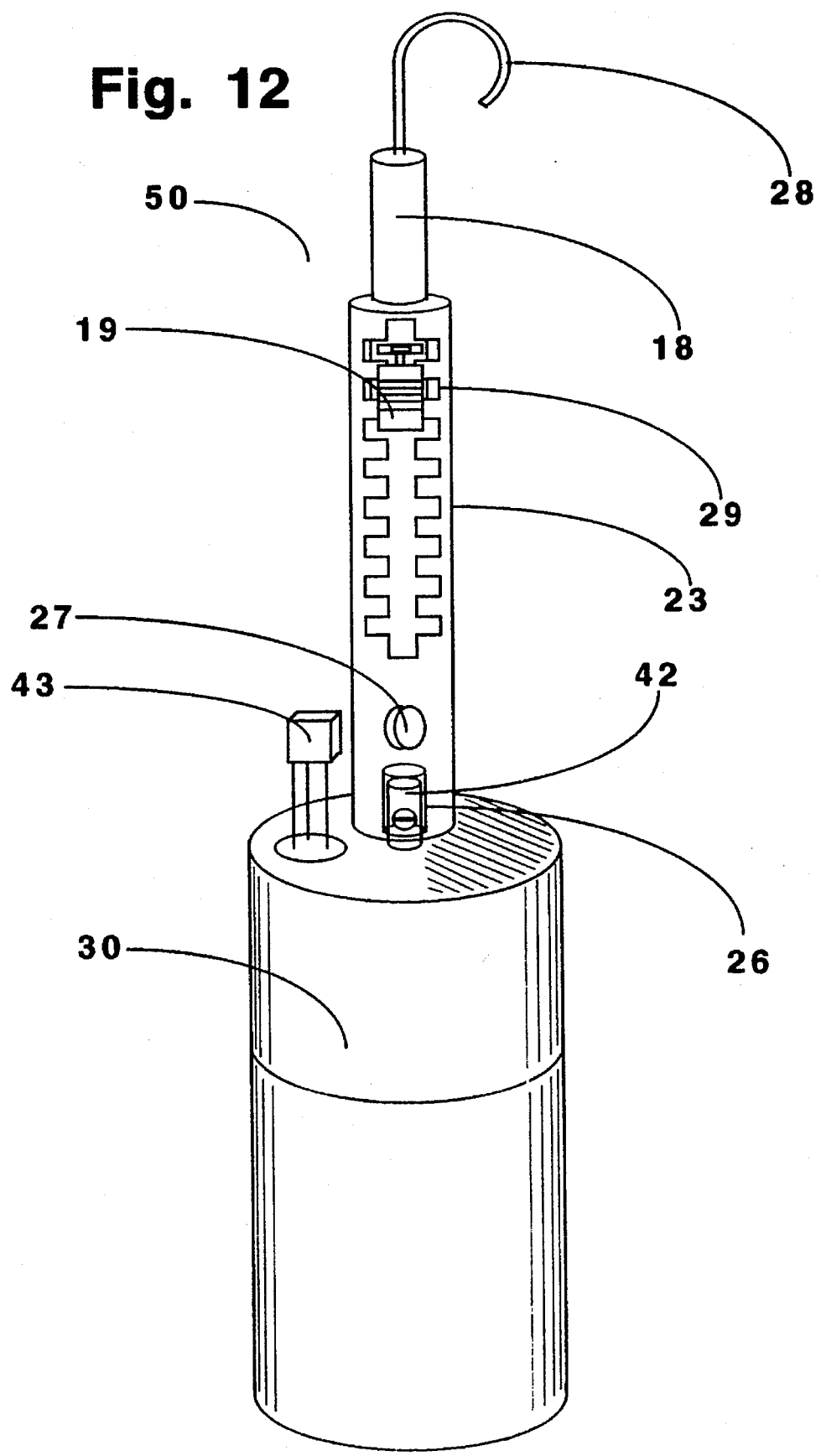
FIG. 12 is an isometric illustration of the telescoping linear ratchet connecting shaft, gear motor, magnet, and Hall effect sensor indicating their relative positions.

Gear motor 30 as illustrated in FIGS. 4, 5, and 12 is a miniature, direct current, reversible motor mechanically coupled in combination with a miniature gear head of the planetary or spur arrangement. Activation of gear motor 30 to perform the desired pivot of the slats 13 is accomplished by way of micro-powered electronics 31, located below gear motor 30 as illustrated in FIGS. 4 and 5 on a printed circuit board (p.c.) 45, which is physically mounted to one of two mounts 44. The upper mount is physically integrated as part of the bottom terminal end of gear motor 30 where the upper terminal end of p.c. board 45 is mounted. The lower terminal mount 44 FIGS. 4 and 14, holds the bottom terminal end of p.c. board 45 in place within the confines of housing 11 and connected on the opposite side of mount 44 is the battery cathode contact spring 32.

Figure 17:
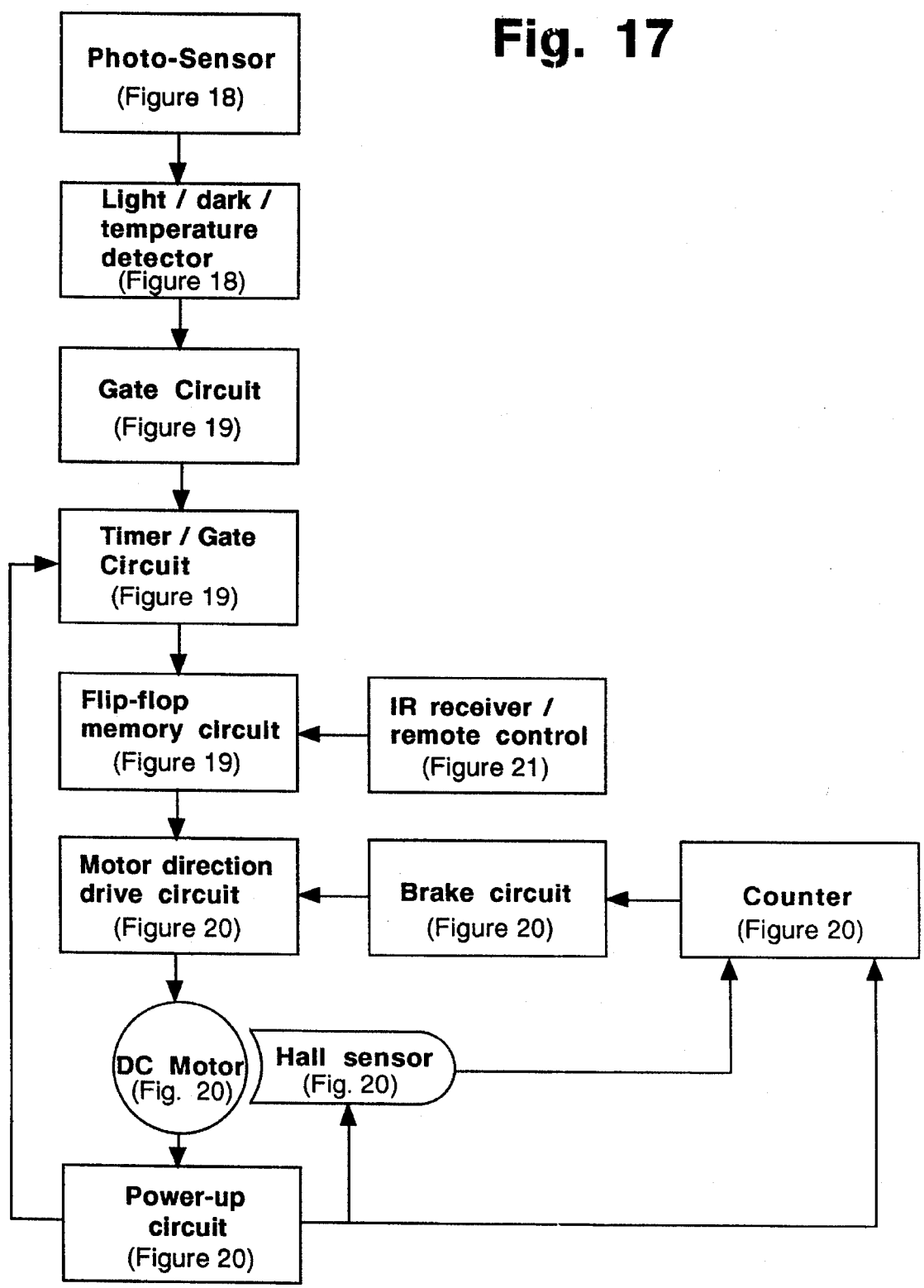
FIG. 17 is a diagrammatic illustration representing a flow chart of the various circuit configurations and their interconnected functions.

FIG. 17 is a flow chart of the micro-powered electronics 31 showing the basic connected functions of FIGS. 18, 19, 20, and 21. Photo sensor Q1 illustrated in the schematic of micro-powered light/dark/temperature detector circuit FIG. 18, and also physically illustrated as photo sensor 47 FIGS. 4, and 5, senses the light conditions and sends its signal via a conduit 46 (torque brace) FIGS. 4 and 5, to the detector circuit of FIG. 18. In addition, the conduit 46 FIGS. 4 and 5 acts to restrain reverse torque backlash by way of bracing torque initiated by its short curved projection containing the photo-sensor 47 at the terminal end. The terminal end of the curved conduit 46 is inserted in an open ended vertical slot structurally integrated as part of stop clip 17 (torque brace clip) and connected by a self adhesive backing 54 or the like, and located toward the upper terminal end of plastic stop clip 17, to the opposite side of the head rail 12, facing the window of installation as illustrated in FIGS. 2, 3, and 4. Clip 17 is quickly and readily attachable, and is preferably made of transparent plastics. It should be noted torque brace or conduit 46 and stop clip 17 are substantially concealed when in use, being small and hidden directly behind shaft 14 and the upper end or ratchet 50 of my apparatus 10 as may be ascertained from FIG. 1. The signal from photo-sensor 47 (Q1) of FIG. 18, conditioned by the ambient light trigger set point determined by the increased resistance to the forward bias voltage on the base of Q13 and Q14 as set by S4, S5, and S6 of FIG. 18 and illustrated by DIP switch 48 FIGS. 4 and 5, is used by the remaining detector circuit of FIG. 18 to determine when an automatic pivot of the slats 13 will commence.

This part of the circuit utilizes and takes advantage of the minuscule peak current rating of a particular thyristor called a programmable unijunction transistor, in this case Q16 and Q19 with a drain of 1 micro ampere in the quiescent state. The programmable unijunction transistor (P.U.T.), can be kept in the conduction state with just the leakage current between a reversed biased diode applied to its trigger gate. Consequently, only a minute amount of current is needed to keep it in the non-conducting state. By limiting the time current flows to the anode of the programmable unijunction transistor by charging a capacitor through a high impedance resistor, the P.U.T. only avalanches briefly a high current pulse when the gate is triggered, and then reducing current flow (due to the behavior of negative resistance upon the cathode of the P.U.T. and the depletion of energy stored within the capacitor), to a minuscule level determined by the high impedance resistor connected to its anode. Therefore, the programmable unijunction transistor can be utilized to configure a frugal power using comparator circuit which will send a brief pulse at the transition between light, dark, or temperature points.

Figure 18:
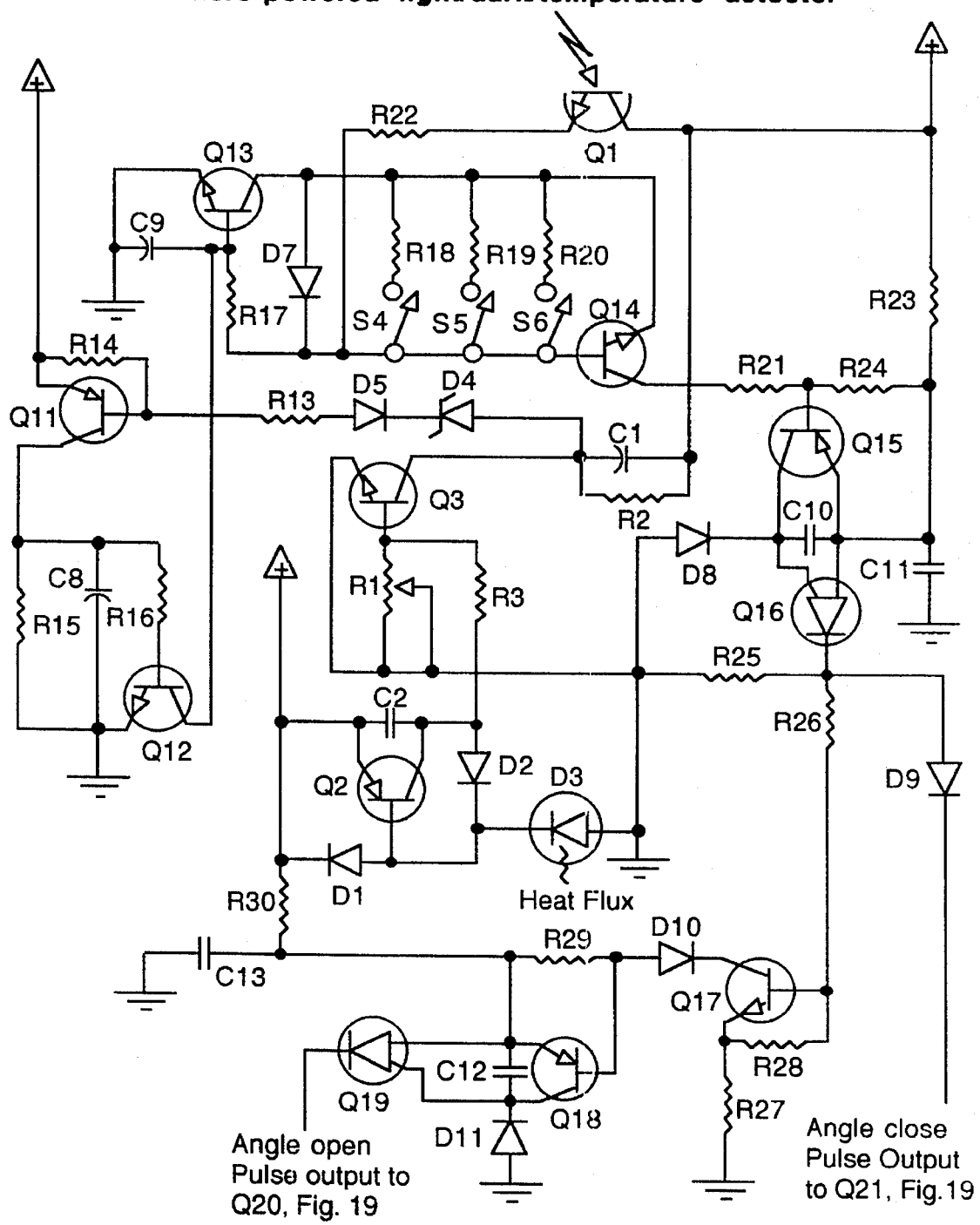
FIG. 18 is a schematic illustration as represented in FIG. 17, of a micro-powered circuit for detecting light, dark, and temperature variations.

The temperature detection circuit comprises diode D3 acting as the heat sensor, and Q2, Q3, Q11, and Q12 and associated components acting to detect and amplify the signal from D3 illustrated in schematic FIG. 18 cancels all forward bias to the base of Q13 allowing the same condition that would exist in darkness, hence eliminating forward bias to the base of Q15 which shunts the gate and anode of P.U.T. Q16. Q15 effectively allows or disallows conduction of Q16. When a predetermined temperature point is reached as set by potentiometer R1, a tilting of the slats 13 to the closed position is initiated blocking the suns radiation.

Figure 16:
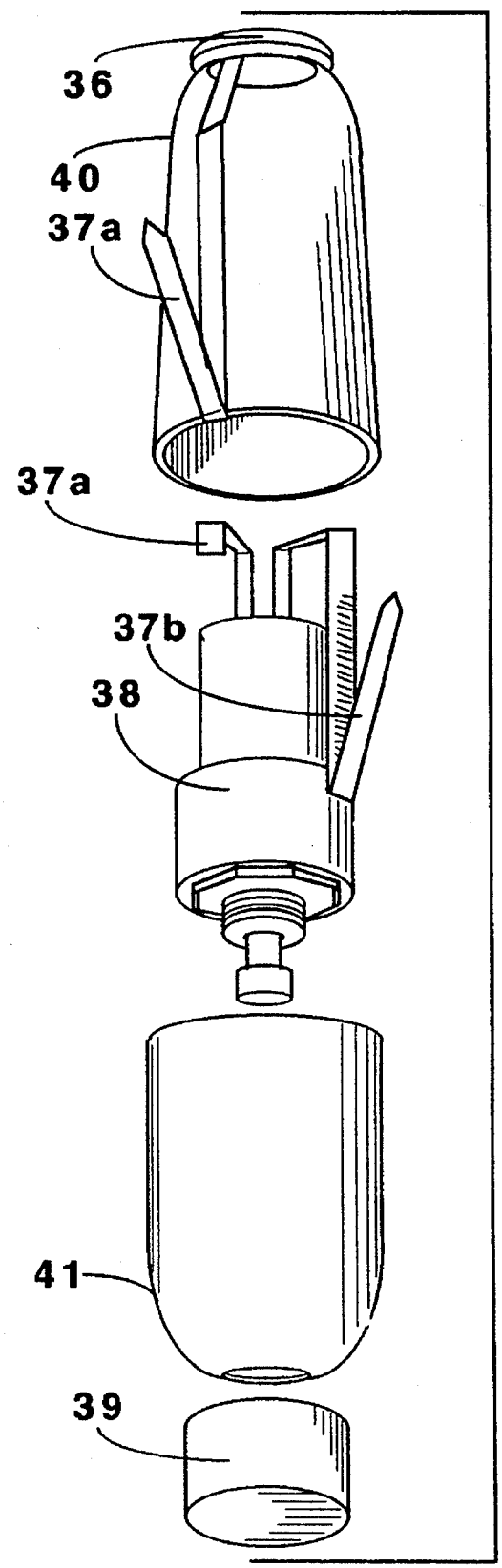
FIG. 16 is an exploded illustration as depicted in FIG. 15, of the various parts representing the construction of the battery cell containment plug.
Figure 19:
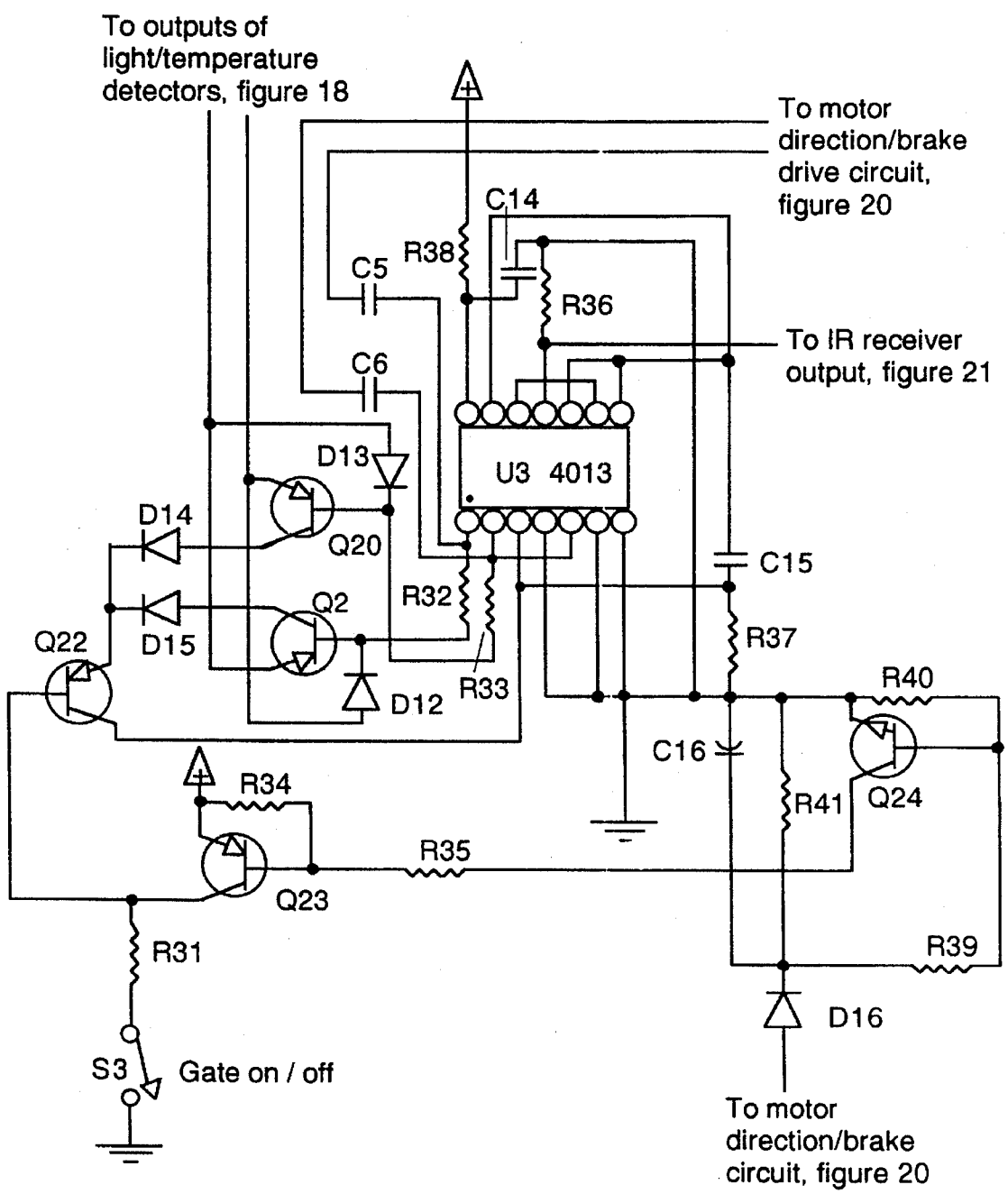
FIG. 19 is a schematic illustration as represented in FIG. 17, of a micro-powered one bit flip-flop memory gate circuit.

The brief pulse from Q16 or Q19, as a result of changing light and/or temperature conditions, are used to trigger a CMOS dual D flip-flop circuit U3 as illustrated in the schematic of FIG. 19 (also a frugal power user when its positive supply is limited with the same capacitor/resistor arrangement as mentioned for supplying Q16 and Q19 in FIG. 18), which determines the time of activation and the direction the gear motor will take. Two transistors Q20 and Q21 and associated components in concert with U3 act as gates to determine whether a pulse from the detector FIG. 18 is valid or not valid. Flip-flop U3 FIG. 19, always follows the pivot action of the angled position of the slats 13 and therefore only one of the gates Q20 or Q21 is on or potentially conducting at any one time. If the angled position is manually changed by switch 38 as illustrated in FIGS. 13, 15, and 16, (indicated by S11 in schematic FIG. 21), or by the output from remote control FIG. 21, which directly controls U3 without going through the gates, the gates conducting states become 180° out of synchrony with the flip-flop output states of U3 (pins 1 and 2), and the next pulse from detector circuit FIG. 18, due to a change in light conditions, will be ignored because that gate will be potentially non-conducting or off, not allowing U3 FIG. 19, control pin 3 to receive the pulse from the detector circuit FIG. 18. The next change in light conditions and the subsequent pulse will not be ignored and the detector will once again be in synchrony with the gates and output of U3, therefore the angled position of the slats 13. This circuit configuration gives the electronic powered angling rod 10 a simple memory which keeps the Venetian blind 52 angled in synchrony with the light conditions. In addition a third gate comprising a pnp transistor Q22, temporarily blocks all potential pulses from both gates Q20 and Q21 to control pin 3, u3 FIG. 19, to prevent the slats 13 from pivoting more than once at the approach of dawn or dusk. This eliminates the effects of rapidly changing light conditions that are inherent as the day approaches or recedes behind the horizon. Detector FIG. 18 may send pulses reflecting the low fluctuating ambient light conditions, but U3 FIG. 19 only receives the first pulse. Any pulses after the first cannot get through because gate Q22 is in a potentially non-conducting state or off, as a result of a timer circuit comprising Q24, Q23, and associated components. The timer is activated when the motor drive circuit FIG. 20, including gear motor 30 is activated, during a single pivot of the slats 13. Timing is dependent upon a predetermined discharge rate of an electrolytic capacitor C16. S3, FIG. 19, of DIP switch 48 illustrated in FIGS. 4 and 5 allows or disallows operation of gate Q22, therefore the automatic operation of the angling of the slats 13, leaving manual operation only, if desired, if switch S-3 is open.

Figure 20:
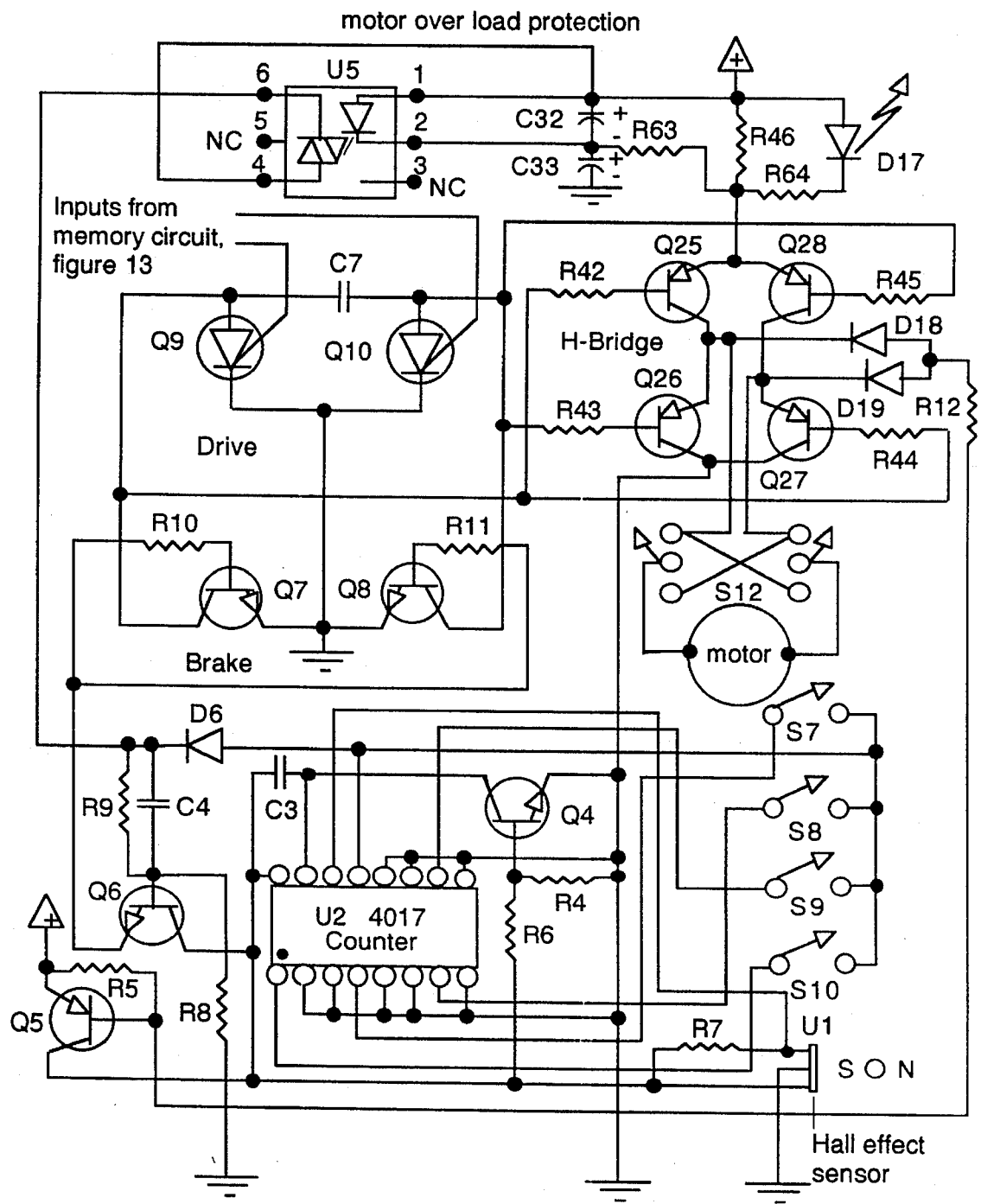
FIG. 20 is a schematic illustration as represented in FIG. 17, of a motor directional drive, and brake circuit.

One of the trigger gates of thyristors (SCR), Q9 or Q10 of FIG. 20, are turned on or conducting in response to a brief positive going pulse through dc blocking capacitors, C5 or C6 FIG. 19 in response to a change in output states of pins 1 and 2 of flip-flop U3 FIG. 19. When either Q9 or Q10 FIG. 20 are conducting, a negative current flow is applied to two of four pnp transistors in an H-bridge configured directional drive circuit comprising Q25, Q26, Q27, and Q28 FIG. 20, which determines the correct polarity applied to switch S-12 FIG. 20 and gear motor 30, hence the direction of the pivot angle of slats 13. Switch S-12 is a double-pole double-throw switch connected in series between the H-bridge, Q25, Q26, Q27, Q28 and gear motor 30 allowing reorientation of the slats 13 angle. The current flow in gear motor 30 in either direction by way of D18 or D19, FIG. 20, in turn activates a counter U2, brake circuit Q6, Q7, Q8, and Hall sensor U1 (43), all of schematic illustration FIG. 20, by way of a power up/reset circuit comprising transistors Q4 and Q5 and associated components. Q4 and C3 specifically act to reset the counter U2 upon power up. Counter U2 FIG. 20 determines the braking point at which the slats 13 halt their pivot action.

The final pivot angle of the slats 13 is determined by the number of rotations of gear motor 30, ratchet device 50, worm gear shaft 14, worm gear 15, worm wheel 16, and as predetermined by the brake set point of counter U2 FIG. 20. The brake set point is determined by a set of switches S7, S8, S9, or S10 of DIP switch 48, illustrated in FIGS. 4 and 5 which are in series with the sequential outputs of pins 4, 7, 10, and 1 of counter U2 FIG. 20. Pin 14 of counter U2 FIG. 20, receives pulses from a Hall effect sensor illustrated symbolically as U1 in the schematic FIG. 20, and physically illustrated as 43 in FIGS. 5 and 12. The Hall effect sensor 43 (U1) is located as illustrated in FIGS. 5 and 12 adjacent to the lower half of the ratchet device 50, top of gear motor 30, where a small magnet 27 illustrated in FIGS. 4, 5, and 12 is embedded within the lower half of hollow ratchet shaft 23 just above the coupler cavity 26. As the south pole of magnet 27 rotates with ratchet device 50 and sweeps passed the stationary Hall effect sensor 43 (U1) FIGS. 5 and 12, it magnetically triggers Hall effect sensor 43 (U1) to briefly send a negative going pulse to clock pin 14 of counter U2 FIG. 20. As counter U2, pins 4, 7, 10, or 1 shifts output states sequentially from a negative to a positive in response to the signals from Hall effect sensor 43 (U1), to clock pin 14 U2, as selected by one of S7, S8, S9, or S10 of DIP switch 48, the positive going output signal from the selected switch is filtered by R9 and C4 FIG. 20 to a brief pulse which briefly triggers a conduction state of transistor Q6, deriving its power from the same power up circuit as U2, previously described comprising Q4, Q5, and associated components. The amplified positive going output pulse of the emitter of Q6 FIG. 20 cause Q7 and Q8 FIG. 20 to both conduct briefly inducing a brief shunt condition across both anodes of Q9 and Q10, causing either Q9 or Q10 to quit conducting or turn off, effectively halting current to gear motor 30, and simultaneously creating a brief electrical short across the outputs of H bridge Q25, Q26, Q27, and Q28 and gear motor 30, creating an instantaneous braking action of gear motor 30 and its rotational output upon the ratchet device 50 and therefore the pivot action of the slats 13. L.E.D. D17 FIG. 20 briefly indicates visually a braking action has taken place. Since current no longer flows to gear motor 30, the power-up circuit comprising Q4 and Q5 in FIG. 20, no longer supplies power to counter U2, brake circuit Q6, Q7, Q8, or Hall effect sensor 43 (U1) of FIG. 20, until another signal pulse is detected by changing light conditions on Q1 FIG. 18, or a manual or remote signal is sent as per schematic FIG. 21. Braking action also occurs, if by chance there is a mechanical shunt of gear motor 30 while in operation, by way of U5 and associated components illustrated in schematic FIG. 20, by detecting a current surge over load upon the power inputs of the H bridge drive circuit transistors Q25, Q26, Q27, and Q28 of FIG. 20. If a current surge over load is detected by U5, a signal is sent to transistor Q6, causing the braking action.

Figure 21:
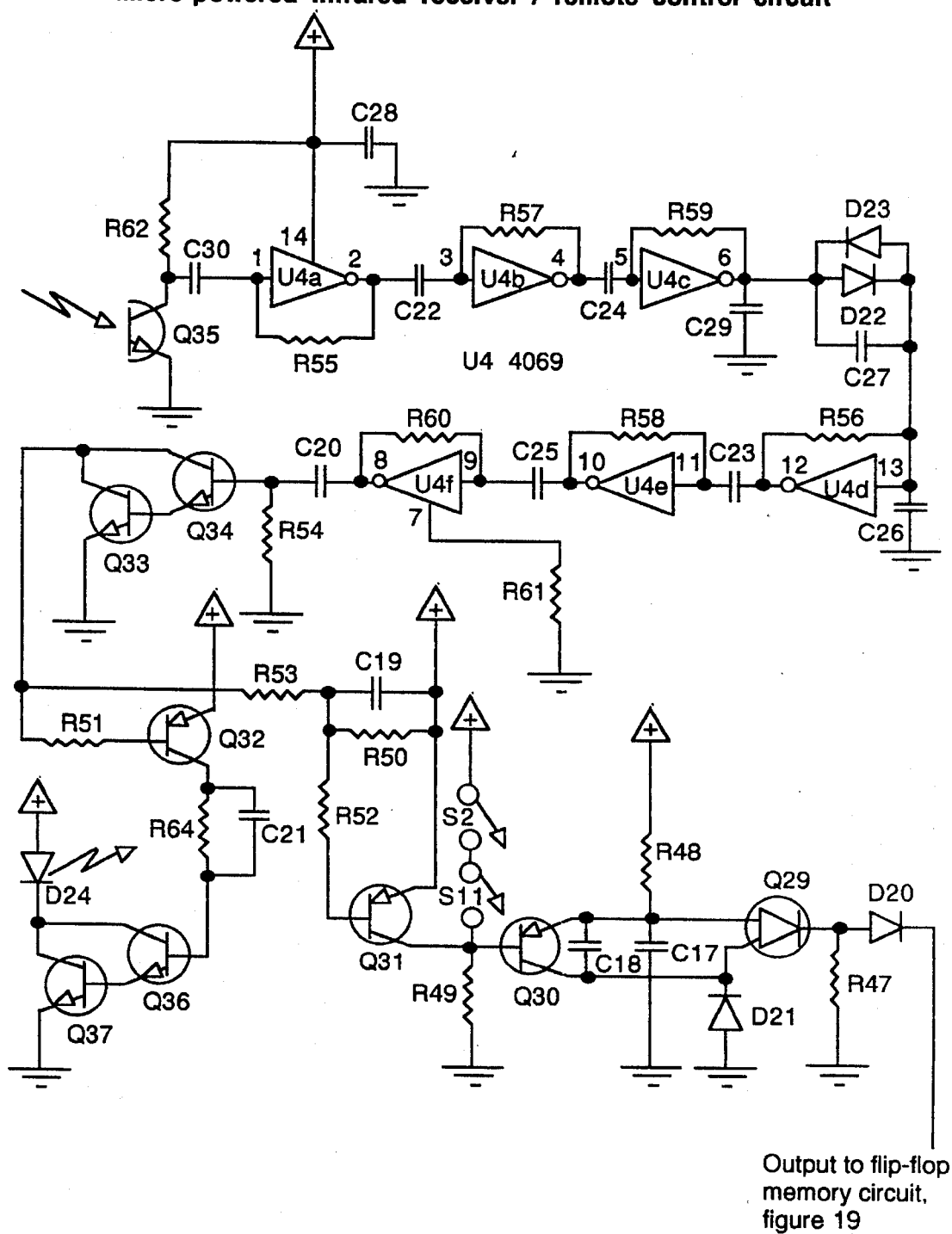
FIG. 21 is a schematic illustration as represented in FIG. 17, of a micro-powered infrared receiver remote control circuit.

Remote control circuit schematic FIG. 21 is a micropowered infrared light signal receiver that serves to remotely trigger a pivot action of slats 13 to a closed or open angled position. A modulated infrared light signal is sent via a transmitter and received by Q35 schematic FIG. 21 and amplified and filtered by hex inverter U4 and associated components. This output signal is further amplified by a Darlington configuration comprising Q34 and Q33 and further filtered and amplified via Q31, Q30, and associated components, where the filtered output signal triggers a brief output pulse from P.U.T. Q29. This output signal pulse is sent to the second half of flip flop U3, FIG. 19, that is linked through dc blocking capacitor C-15 to the control pin 3 of the first flip flop of U3 FIG. 19 controlling the direction and time a pivot angling of the slats 13 will take place. Q32, Q36, Q37 and L.E.D., D24 of FIG. 21 act to visually indicate infrared signal reception.

Although I have very specifically described the preferred structures and use of the invention, it should be understood that some changes in the specific structures described and shown in my drawings may clearly be made without departing from the true scope of the invention in accordance with the appended claims.

What I claim as my invention:

1. An electrically powered control rod for controlling positional tilt angle of slats of a Venetian window blind, said control rod comprising, an elongated tubular housing structured to be supported lengthwise vertically oriented in close proximity and perpendicular to horizontally disposed slats of a Venetian window blind and laying over a front surface of the slats;

an electric motor attached to said tubular housing;

at least one battery within said tubular housing and connected to circuitry and switching means for controlling electrical current flow from said at least one battery to said motor for activating and deactivating said motor, said circuitry and switching means generally contained within said tubular housing;

a shaft coupled to said motor and rotatable with activation of said motor, coupling means for connecting said shaft to a slat angle rotary drive means of the Venetian window blind for altering positional tilt angle of the slats, said coupling means for at least in part supporting said tubular housing in position relative to the Venetian window blind, said coupling means being rotatable with rotation of said shaft via activation of said motor so as to power the slat angle rotary drive means of the Venetian window blind and to alter the position of the slats;

torque brace means in spaced relationship from said coupling means for preventing rotation of said tubular housing while allowing rotation of said shaft by said motor;

means for adjusting the spacing between said coupling means and said torque brace means.

2. An electrically powered control rod in accordance with claim 1 wherein said means for adjusting the spacing includes said shaft being telescopically adjustable in length.

3. An electrically powered control rod in accordance with claim 2 wherein said torque brace means is generally concealed in use.

4. An electrically powered control rod in combination with a Venetian window blind for controlling positional tilt angle of slats of the Venetian window blind; comprising, an elongated tubular housing supported lengthwise vertically oriented in close proximity and perpendicular to horizontally disposed said slats of the Venetian window blind and laying over a front surface of said slats;

an electric motor attached to said tubular housing;

at least one battery within said tubular housing and connected to circuitry and switching means for controlling electrical current flow from said at least one battery to said motor for activating and deactivating said motor, said circuitry and switching means generally contained within said tubular housing;

a shaft coupled to said motor and rotatable with activation of said motor, coupling means, a first end of said coupling means connected to said shaft, a second end said coupling means connected to a slat angle rotary drive means of the Venetian window blind for altering positional tilt angle of the slats, said coupling means at least in part supporting said tubular housing in position relative to the Venetian window blind, said coupling means being rotatable with rotation of said shaft via activation of said motor so as to power the slat angle rotary drive means of the Venetian window blind and to alter the position of the slats;

torque brace means preventing rotation of said tubular housing while allowing rotation of said shaft and said coupling means by said motor;

means for adjusting the spacing between said coupling means and said torque brace means.

5. An electrically powered control rod in accordance with claim 4 wherein said means for adjusting the spacing includes said shaft being telescopically adjustable in length.

6. An electrically powered control rod in accordance with claim 5 wherein said torque brace means is generally concealed in use.

7. An electrically powered control rod for controlling positional tilt angle of slats of a Venetian window blind and for eliminating need for a manually operated non-electrically power control rod on a Venetian window blind, said electrically powered control rod comprising, an elongated small diameter tubular housing structured to be supported lengthwise vertically oriented in close proximity and perpendicular to horizontally disposed slats of a Venetian window blind and laying over a surface of the slats;

an electric motor attached to said tubular housing;

at least one battery within said tubular housing and connected to circuitry and switching means for controlling electrical current flow from said at least one battery to said motor for activating and deactivating said motor, said circuitry and switching means generally contained within said tubular housing;

a shaft coupled to said motor and rotatable with activation of said motor, coupling means for connecting said shaft to a slat angle rotary drive shaft of the Venetian window blind for altering positional tilt angle of the slats, said coupling means for at least in part supporting said tubular housing in position relative to the Venetian window blind, said coupling means being rotatable with rotation of said shaft via activation of said motor so as to power the slat angle rotary drive shaft of the Venetian window blind and to alter the position of the slats;

said coupling means including universal joint effect means for compensating for angular differences between said shaft and said slat angle rotary drive shaft of the Venetian window blind;

torque brace means in spaced relationship from said coupling means for preventing rotation of said tubular housing while allowing rotation of said shaft by said motor.

8. An electrically powered control rod in accordance with claim 7 including means for adjusting the spacing between said coupling means and said torque brace means.

* * * * *